US011872815B2

(12) United States Patent
Benton et al.

(10) Patent No.: US 11,872,815 B2
(45) Date of Patent: Jan. 16, 2024

(54) PURGED INK REMOVAL FROM PRINT HEAD

(71) Applicant: MARKEM-IMAJE CORPORATION, Keene, NH (US)

(72) Inventors: Frances H. Benton, Keene, NH (US); Richard A. Gardner, Walpole, NH (US); Arjun Venkataramanan, Keene, NH (US); Jose Raul Ramirez, Milford, NH (US)

(73) Assignee: Markem-Imaje Corporation, Keene, NH (US)

( * ) Notice: Subject to any disclaimer, the term of this patent is extended or adjusted under 35 U.S.C. 154(b) by 141 days.

(21) Appl. No.: 17/603,865

(22) PCT Filed: Apr. 16, 2020

(86) PCT No.: PCT/US2020/028557
§ 371 (c)(1),
(2) Date: Oct. 14, 2021

(87) PCT Pub. No.: WO2020/214838
PCT Pub. Date: Oct. 22, 2020

(65) Prior Publication Data

US 2022/0297433 A1 Sep. 22, 2022

Related U.S. Application Data

(60) Provisional application No. 62/925,746, filed on Oct. 24, 2019, provisional application No. 62/836,235, filed on Apr. 19, 2019.

(51) Int. Cl.
*B41J 2/165* (2006.01)
*B41J 2/17* (2006.01)

(52) U.S. Cl.
CPC ......... *B41J 2/16517* (2013.01); *B41J 2/1707* (2013.01); *B41J 2002/16564* (2013.01)

(58) Field of Classification Search
CPC .................. B41J 2/16517; B41J 2/1707; B41J 2002/16564
See application file for complete search history.

(56) References Cited

U.S. PATENT DOCUMENTS 4,411,706 A 10/1983 Wallace et al.
4,591,869 A 5/1986 Katerberg et al.
(Continued)

FOREIGN PATENT DOCUMENTS

CN 102858547 1/2013
EP 1462256 A2 9/2004
(Continued)

OTHER PUBLICATIONS

International Search Report/Written Opinion, issued by USPTO dated Jul. 21, 2020, 10 pages.
(Continued)

*Primary Examiner* — Sharon Polk
(74) *Attorney, Agent, or Firm* — Fish & Richardson P.C.

(57) ABSTRACT

Systems and methods for industrial printing, e.g., using drop-on-demand (DOD) inkjet print heads, include, in at least one aspect, a printing device including: a print head including a print engine, including multiple nozzles, and circuitry to selectively eject ink through the multiple nozzles to form an image on a moving substrate, and to purge the ink through the multiple nozzles; and a printhead enclosure having an opening in front of the multiple nozzles to allow the selectively ejected ink to pass through the opening when the selectively ejected ink is ejected toward the moving substrate; wherein the printhead enclosure includes a hole placed away from the multiple nozzles; and wherein the
(Continued)

printhead enclosure is configured to direct the ink that is purged through the multiple nozzles along an inside surface of the printhead enclosure to the hole through which the ink flows and exits the printhead enclosure.

28 Claims, 20 Drawing Sheets

(56) References Cited

U.S. PATENT DOCUMENTS

| | | | |
|---|---|---|---|
| 4,617,574 | A | 10/1986 | Miller et al. |
| 4,714,932 | A | 12/1987 | Reynaud |
| 5,121,130 | A | 6/1992 | Hempel et al. |
| 5,929,882 | A | 7/1999 | Sharpe |
| 6,000,791 | A | 12/1999 | Scheffelin et al. |
| 6,643,130 | B1 | 11/2003 | Demarchis et al. |
| 6,854,825 | B1 | 2/2005 | Silverbrook |
| 6,890,053 | B2 | 5/2005 | Myhill et al. |
| 7,357,475 | B2 | 4/2008 | Silverbrook |
| 7,419,239 | B2 | 9/2008 | Brown et al. |
| 7,600,852 | B2 | 10/2009 | Brown et al. |
| 8,070,277 | B2 | 12/2011 | Phillips et al. |
| 8,262,192 | B2 | 9/2012 | Matsumoto |
| 8,376,507 | B2 | 2/2013 | Friedmann et al. |
| 8,591,000 | B1 | 11/2013 | Snyder |
| 8,714,721 | B2 | 5/2014 | Frazier et al. |
| 8,721,041 | B2 | 5/2014 | Broderick et al. |
| 8,857,959 | B2 | 10/2014 | Ishida et al. |
| 9,227,401 | B2 | 1/2016 | Fujii et al. |
| 9,259,933 | B1 | 2/2016 | Fima |
| 9,409,420 | B2 | 8/2016 | O Hara |
| 9,511,605 | B2 | 12/2016 | Barnett et al. |
| 10,183,498 | B2 | 1/2019 | Barnett et al. |
| 10,538,114 | B2 | 1/2020 | Barnett et al. |
| 11,173,724 | B1 | 11/2021 | Zhang et al. |
| 11,186,086 | B2 | 11/2021 | Benton et al. |
| 2004/0189744 | A1 | 9/2004 | Myhill et al. |
| 2005/0225590 | A1 | 10/2005 | Silverbrook |
| 2007/0159791 | A1 | 7/2007 | Pongracz et al. |
| 2007/0268331 | A1 | 11/2007 | Sakurai |
| 2008/0122910 | A1 | 5/2008 | Ramakrishnan |
| 2008/0278550 | A1 | 11/2008 | Xu et al. |
| 2009/0002463 | A1 | 1/2009 | Xu et al. |
| 2010/0208020 | A1 | 8/2010 | Matsumoto |
| 2011/0187791 | A1 | 8/2011 | Kaieda et al. |
| 2012/0081455 | A1 | 4/2012 | Kritchman et al. |

FOREIGN PATENT DOCUMENTS

| | | | |
|---|---|---|---|
| EP | 3160749 | | 6/2019 |
| JP | 41722961 | A | 8/2008 |
| JP | 2009523323 | A | 6/2009 |
| KR | 100845477 | | 7/2008 |
| KR | 1020130112005 | A | 10/2013 |
| WO | WO2007048293 | A1 | 5/2007 |
| WO | WO 2011/138729 | | 11/2011 |
| WO | WO18/131917 | | 7/2018 |
| WO | WO2019064756 | A1 | 4/2019 |

OTHER PUBLICATIONS

International Application No. PCT/US2020/028557, Notification of Transmittal of the International Search Report and the Written Opinion of the International Searching Authority, dated Jul. 21, 2020, 10 pages.

European Application No. 20170167.9, Extended European Search Report, dated Sep. 9, 2020, 10 pages.

Cleanflow Videojet, https://www.youtube.com/watch?v-798HubiSiKU, Feb. 8, 2019, 3 pages.

"1580 Videojet injet coding", https://www.mapersa.com/videojet/VIDEOJET-1580/, Feb. 8, 2019, 2 pages.

"Videojet—Marking and coding solutions, videojet is the world leader in the market of product identification for all industries", http://www.mapersa.com/english/products/videojet, Feb. 8, 2019, 3 pages.

"Videojet Technologies Introduces Case Coding Printers to Drive Higher Uptime", https://www.videojet.com/us/homepage/general/news/videojet-introduces-case-coding-pri, Oct. 14, 2019, 2 pages.

Extended European Search Report in European Appln No. EP20791440.9, dated Mar. 24, 2022,10 pages.

Notice of Allowance in U.S. Appl. No. 16/850,964, dated Aug. 23, 2021, 7 pages.

Office Action in U.S. Appl. No. 16/850,964, dated Apr. 15, 2021, 22 pages.

Response to Office Action in U.S. Appl. No. 16/850,964, dated Jul. 6, 2021, 8 pages.

PURGED INK REMOVAL FROM PRINT HEAD

CROSS-REFERENCE TO RELATED APPLICATIONS

This application claims priority to U.S. Provisional Patent Application No. 62/836,235, filed Apr. 19, 2019, the entire content of which is incorporated herein by reference. This application also claims priority to U.S. Provisional Patent Application No. 62/925,746, filed Oct. 24, 2019, the entire content of which is incorporated herein by reference.

BACKGROUND

This specification relates to industrial printing systems, and in particular, systems and techniques relating to drop-on-demand (DOD) inkjet print heads.

Various industrial printing technologies are known and enable the printing of important information (e.g., sell by dates) on packaging. DOD inkjet print heads have been used to print images on commercial products using various types of inks including hot melt inks. These images can include graphics, company logos, alphanumeric codes, and identification codes. For example, such images are readily observable on the corrugated cardboard boxes containing consumer products. In addition, in the course of printing such images, dust particles in factory air often land on the nozzle plate of DOD print heads and then block the nozzles. This can cause unprinted lines, due to blocked jets, across the print, which in turn may result in bad quality prints. To avoid this, users of traditional DOD print heads purge the print head frequently. Purging involves forcing an amount of ink out of the nozzles in order to flood away debris. To achieve high quality print requirements, the printer can be set up to automatically purge after a number of prints, such as every 1000 prints, and in some cases, a purge may be needed after only 50 prints. In some cases, a small purge may be performed between every print. Purging can interrupt the printing operation and consumes ink.

In addition, the purged ink must be handled in some manner. One approach is to place a removable drip tray under the nozzles to catch the purged ink, where the removable drip tray is held in place by a bracket attached to the exterior of the print head. In some cases, a drip shield is used to help guide the purged ink away from the production and/or packaging line and into the removable drip tray. Another approach is to capture and recirculate the ink, such as by using a blast of air during the purge to push the purged ink into a channel on the side of the print head and use a vacuum to pull the purged ink through a filter and back into the clean ink supply.

SUMMARY

This specification describes technologies relating to industrial printing systems, and in particular, systems and techniques relating to drop-on-demand (DOD) inkjet print heads used in a manufacturing or distribution facility. The printhead enclosure itself is used to catch purged ink and remove the purged ink from the print head. In some implementations, a heated pathway is provided within the enclosure to keep ink molten and to direct the ink to an exit hole at the back of the printhead enclosure. A heating component provides a heated path of least resistance for purged hot melt ink to flow, passing through the inside bottom of the printhead enclosure and out a buildup free drip edged hole near the rear of the print head into an ink drip tray, cup or other container that has its front edge located away (e.g., more than half way of the length of the print head) from the front of the print head. Further, the systems and techniques described in this application can be used with liquid inks as well as with phase change inks.

In general, one or more aspects of the subject matter described in this specification can be embodied in one or more printing devices that include: a print head including a print engine, including multiple nozzles, and circuitry configured to selectively eject ink through the multiple nozzles to form an image on a moving substrate, and to purge the ink through the multiple nozzles; and a printhead enclosure of the print head, the printhead enclosure having an opening in front of the multiple nozzles to allow the selectively ejected ink to pass through the opening when the selectively ejected ink is ejected toward the moving substrate; wherein the printhead enclosure includes a hole placed away from the multiple nozzles; and wherein the printhead enclosure is configured to direct the ink that is purged through the multiple nozzles along an inside surface of the printhead enclosure to the hole through which the ink flows and exits the printhead enclosure.

The printhead enclosure can include a protrusion at the hole, the protrusion extending below an outer bottom surface of the printhead enclosure in the print orientation, and the protrusion having a surface portion below the outer bottom surface of the printhead enclosure in the print orientation, wherein the surface portion of the protrusion is small enough that gravitational force overcomes surface tension of the ink at the surface portion of the protrusion. The outer bottom surface of the printhead enclosure can be a first outer bottom surface of the printhead enclosure adjacent the protrusion, and the printhead enclosure can include an edge placed between the first outer bottom surface of the printhead enclosure and a second outer bottom surface of the printhead enclosure in the print orientation, the edge being configured and arranged to prevent the ink from spreading to the second outer bottom surface of the printhead enclosure. Moreover, the protrusion can extend below the outer bottom surface of the printhead enclosure in the print orientation by at least two millimeters.

The ink can be a liquid ink, and the inside surface of the printhead enclosure can define a channel, wherein the channel is angled with respect to a horizontal plane of a print orientation of the print head to cause the liquid ink that is purged through the multiple nozzles to flow through the channel to the hole, the channel having a higher end located under the multiple nozzles and a lower end located at the hole. The inside surface of the printhead enclosure can include one or more steps, one or more sloped surfaces, or one or more wedge shapes that define the channel.

The ink can be a phase change ink, the print head can include a component positioned along the inside surface of the printhead enclosure, the component being configured to be heated, and the inside surface of the printhead enclosure can be angled with respect to a horizontal plane of a print orientation of the print head to cause the phase change ink that is purged through the multiple nozzles to flow to the hole, when the phase change ink is heated by the component, the inside surface having a higher end located under the multiple nozzles and a lower end located at the hole. The component can be positioned at a distance from the inside surface of the printhead enclosure that is small enough that the phase change ink stays melted under the component, along a channel to the hole, when the component is heated; and the component can include a portion that extends into the hole to keep the phase change ink melted as the phase change ink passes through the hole. The portion of the component that extends into the hole can extend at least half way through the hole and need not extend beyond the protrusion. The channel can be formed by a quantity of the phase change ink that spreads away from the component (e.g., a heating wall of an ink reservoir) along the inside surface of the printhead enclosure and solidifies beyond the distance from the component.

The print head can include an ink reservoir for the phase change ink, the component can include a heating wall for the ink reservoir, and the heating wall can extend beyond the ink reservoir to a distance from the inside surface of the printhead enclosure; wherein the distance is small enough that the phase change ink stays in contact with both the heating wall and the inside surface of the printhead enclosure along a channel, when the phase change ink is melted, until the phase change ink passes through the hole. The angle of the inside surface of the printhead enclosure with respect to the horizontal plane of the print orientation of the print head can be a one degree angle, or other angles. The distance can be between one tenth of a millimeter and five tenths of a millimeter, inclusive, or the distance can be zero when the heating wall extends all the way to the inside surface of the printhead enclosure.

The inside surface of the printhead enclosure can define the channel from the higher end of the inside surface located under the multiple nozzles to the lower end of the inside surface located at the hole, such that the channel is also angled with respect to the horizontal plane of the print orientation of the print head to cause the phase change ink that is purged through the multiple nozzles to flow along the channel to the hole, when the phase change ink is heated by the heating wall. The inside surface of the printhead enclosure can include one or more steps, one or more sloped surfaces, or one or more wedge shapes that define the channel. The printhead enclosure can include a top portion and a bottom portion; and the inside surface can be located in the bottom portion of the printhead enclosure. A surface of the printhead enclosure proximate to the opening an in front of the multiple nozzles can include a sloped surface. The sloped surface can be configured to prevent the liquid ink that is purged from exiting the printhead enclosure through the opening. The opening and the sloped surface can be integral with the printhead enclosure. The printhead enclosure can include a separate piece and the opening and sloped surface can be integral with the separate piece.

The print orientation of the print head can be a first print orientation, the inside surface can be a first inside surface that is angled with respect to the horizontal plane of the first print orientation, the hole can be a first hole in the first inside surface, the printhead enclosure can include a second hole in a second inside surface of the printhead enclosure, and the second inside surface of the printhead enclosure can be angled with respect to a horizontal plane of a second print orientation of the print head, the second inside surface having a lower end located at the second hole and a higher end located under the multiple nozzles in the second orientation. The ink can be a phase change ink, the print head can include a heating component or an extended heating wall for an ink reservoir in the print head, and the heating component or the extended heating wall can be positioned at a distance from the second inside surface of the printhead enclosure that is small enough that the phase change ink stays melted under the heating component or the extended heating wall, along a channel to the second hole, when the heating component or the extended heating wall is heated.

The hole can be located in a back half of the printhead enclosure opposite the opening. The opening can include a slot aligned with the multiple nozzles, and the printhead enclosure can be configured to contain a pressurized airspace at least in front of the multiple nozzles and cause airflow through the slot at a flow rate that prevents dust and debris from entering the slot while the selectively ejected ink passes through the slot and the airflow without a direction of the selectively ejected ink being impeded by the airflow. Thus, in some implementations, with or without the described purge handling system and techniques, the inkjet printhead enclosure is pressurized to direct air flow through a slot in front of the nozzle plate to improve the operation of the print head. A printhead enclosure for a hot melt DOD print head can employ various slot designs, as described herein, where the slot is aligned in front of the nozzles used to eject ink for printing, and the print head can have an onboard pressure source with an inlet air filter.

Thus, one or more aspects of the subject matter described in this specification can be embodied in one or more printing devices that include: a print head configured to selectively eject liquid through multiple nozzles to form an image on a moving substrate; and a printhead enclosure configured to contain a pressurized airspace at least in front of the multiple nozzles of the print head; wherein the printhead enclosure includes a slot that aligns with the multiple nozzles to allow the selectively ejected liquid to pass through the slot when the selectively ejected liquid is ejected toward the moving substrate; and wherein the printhead enclosure is configured to contain the pressurized airspace and cause airflow through the slot at a flow rate that prevents dust and debris from entering the slot while the selectively ejected liquid passes through the slot and the airflow (e.g., the airflow flows through the slot during all time while the printer is powered up) without a direction of the selectively ejected liquid being impeded by the airflow. These and other embodiments can optionally include one or more of the following features.

The printing device(s) can include a smooth and straight interior surface on each of at least two sides of the slot. The pressurized airspace can be set at a pressure level that causes the flow rate of air through the slot to interrupt Couette flow caused by the moving substrate passing the print head and reduce entraining of satellite drops of ink in the Couette flow. The printhead enclosure can include a curved exterior surface on at least a leading edge of the slot. The slot and the curved exterior surface can be integral (integrally formed) with the printhead enclosure. The printhead enclosure can include a separate piece, and the slot and the curved exterior surface can be integral (integrally formed) with the separate piece. Moreover, the separate piece can be configured to slide into and out of the printhead enclosure.

The printhead enclosure can include: the curved exterior surface on each of the leading edge and a trailing edge of the slot, the curved exterior surface having a radius of curvature determined to produce uniform flow distribution between the slot opening and the moving substrate; and a distance between two interior sides of the slot determined to prevent the liquid from coming in contact with the two interior sides of the slot and to maintain consistent, non-turbulent airflow through the slot. The radius of curvature can be between 1.0 and 2.0 millimeters, each of the two interior sides of the slot can be greater than 1 millimeter away laterally from an edge of any of the multiple nozzles to overcome boundary layer effects of the air along the two interior sides of the slot, and a height between a highest point of the curved exterior surface and the multiple nozzles of the print head can be between 2.5 and 7.0 millimeters.

The printing device(s) can include a pressure source input to pressurize the printhead enclosure, the pressure source input being configured and arranged to direct air from a pressure source toward components in the printhead enclosure that diffuse the air so as to provide an even distribution of pressure throughout the printhead enclosure. The printhead enclosure can be pressurized whenever the printing device is powered up such that the airflow through the slot occurs both during prints and between prints. The components can include one or more of baffles, perforated plates, protrusions, nubs, or differently shaped objects designed to diffuse the air entering the printhead enclosure. The print head can include: a print engine configured to selectively eject the liquid through the multiple nozzles; a printer interface board coupled with the print engine; and a nozzle plate coupled with the print engine and defining at least a portion of the multiple nozzles; wherein the components include components of the printer interface board coupled with the print engine.

The pressure source can include an air compressor that provides shop air. The printing device(s) can include the pressure source. The pressure source can include a blower. The pressure source can include a fan. The pressure source can include a pressure source assembly including: a filter; and air intake features configured and arranged to prevent dust particles from reaching the filter. Moreover, the printing device(s) can be included in a printing system that includes a controller device including a user interface; and a print bar configured to receive two or more print heads of the printing device(s), wherein the two or more print heads are configured to attach to the print bar and configured to communicatively couple with the controller device.

The printhead enclosure can include a pressure source located inside the printhead enclosure. The pressure source can be configured to cause air to enter the printhead enclosure through a filter located outside of the printhead enclosure. The pressure source can be configured and arranged to direct air towards one or more inner surfaces of the printhead enclosure that diffuse air so as to provide an even distribution of pressure throughout the printhead enclosure. The printing device can include a blower assembly. The blower assembly can include the filter located outside of the printhead enclosure. The blower assembly can include the pressure source.

Various embodiments of the subject matter described in this specification can be implemented to realize one or more of the following advantages. Using the inside surface of the printhead enclosure to remove the ink from the printhead eliminates any need for an ink tray as part of the print head. This reduces the number of components for the print head and can reduce manufacturing costs. Further, eliminating the ink tray can reduce the costs and time traditionally associated with cleaning the tray and removing purged ink. Note that a larger ink tray requires more space, and a smaller ink tray requires more frequent cleaning. Moreover, in the case of phase change inks, the ink can freeze quickly once it hits the tray, which can result in less than the entire volume of the tray being used and unexpected overflow during a purge, causing ink to run over the edge of the drip tray onto the product line (e.g., conveyor), the floor, etc. Such problems with an ink tray can be entirely avoided using the systems and techniques described in this application.

Moreover, eliminating use of a tray that attaches to an external portion of the printhead enclosure near the nozzle plate removes a protrusion that limits positioning of the printhead with respect to a product line, thus increasing the positioning options for the print head. For example, in a given product line deployment, there can be umbilical cables bent down behind the print head or other objects placed near the printing device, which can limit access to a removable drip tray. Further, without an external drip tray placed under the nozzle plate, the front portion (e.g., front half) of the print head can be brought down to a position that is very close to a conveyor on a product line, allowing printing lower down on the product or on short products or trays. As the purged ink doesn't get close to the product line, the ink flowing through the interior of the printhead enclosure to a back side that is away from the product line, there is no need for an operator to be present to catch the purged ink in a wipe or sheet of paper held under the printhead during a purge operation. Thus, auto purging can be performed as desired, without any risk of mess, improving up-time for the printing device and allowing "hands free" operation for extended periods of time.

In addition, using the force of gravity to remove ink that has been purged through a print head nozzle plate avoids the need to use an air blast and a vacuum, reducing costs for the print head and also avoiding any mess associated with blasting air across a dirty nozzle plate. Moreover, not recirculating the ink avoids the costs associated with adding a filter and related components to the print head, but does not preclude recycling; the systems and techniques described can be used to collect a large quantity of purged ink (liquid ink or phase change ink) in a container that can then be readily transported to a separate location, well away from a product line, for filtering for reuse.

Moreover, various embodiments of the subject matter described in this specification, which include (or combine with the described purge handling removal systems and techniques) a printhead enclosure that is configured to contain a pressurized airspace and cause airflow through a slot at a flow rate that prevents dust and debris from entering the slot, can be implemented to realize one or more of the following advantages. Factory dust particles can be prevented from entering the printhead enclosure and thus from landing on the nozzle plate of the print head. Ink satellites and dust particles can be entrained into the air stream coming out of the slot to prevent them from landing on the nozzle plate and blocking the nozzles. Wood graining effects on a print resulting from ink drops and satellite drops being redirected by the Couette flow (due to the movement of the package/substrate past the print head) can be reduced or eliminated. The total cost of ownership (TCO) for operating the print head can be reduced by reducing ink waste due to purging, as the use of purging (forcing a volume of ink through the nozzles to flood away dirt and debris) as a cleaning operation is reduced or eliminated, and by extending the life of the print head. Preventing nozzles from clogging can help extend the life of the print head because nozzles that are not jetting for extended periods of time can overheat and cause damage to the PZT, and overheating can bake debris into the nozzles making nozzle recovery more difficult and requiring more purging. Moreover, the systems and techniques described can aid in increasing the jetting distance between the nozzle plate and the substrate.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1B:
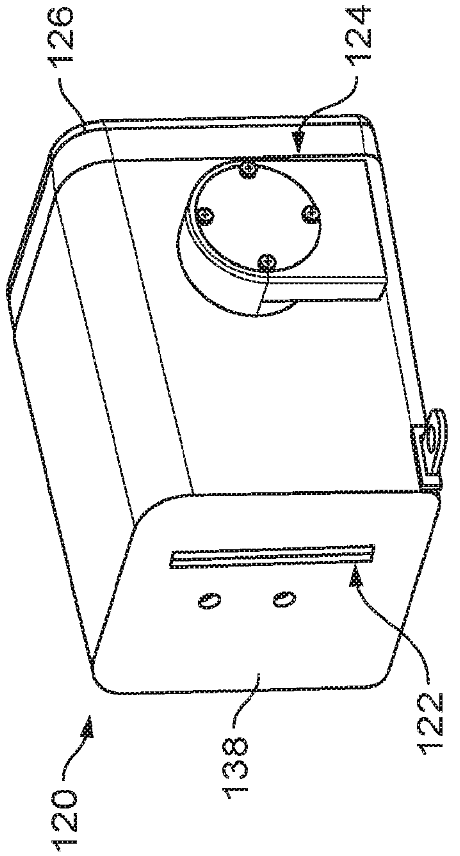
FIG. 1B shows an example of a print head, which can be used in the printing system of FIG. 1A or in other suitable printing systems.
Figure 1C:
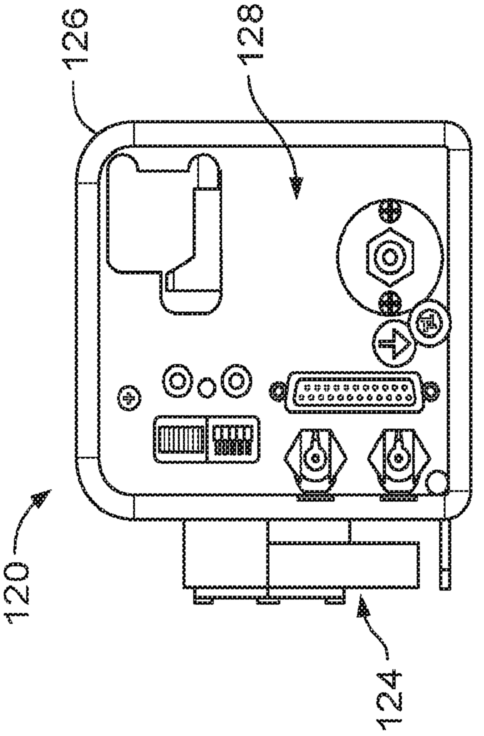
FIG. 1C shows a back side view of the print head from FIG. 1B.
Figure 1A:
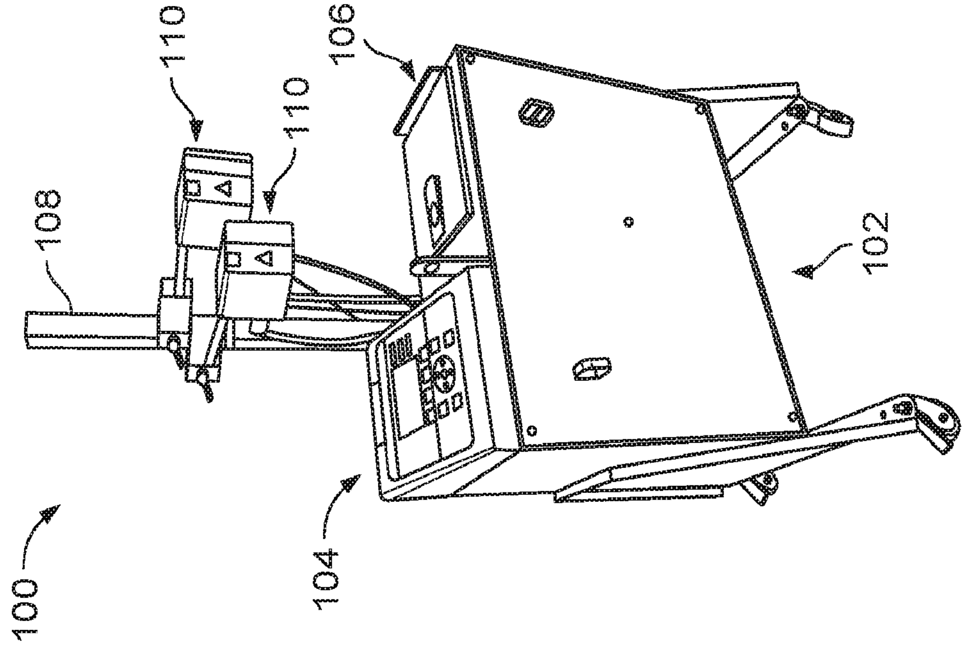
FIG. 1A shows an example of a printing system.

FIG. 1A shows an example of a printing system 100. The printing system 100 includes a cabinet 102 to house a controller device having a user interface 104, and an (off head) ink reservoir having a door 106 for access thereto. The printing system 100 also includes a print bar 108 configured to receive one, two, three, four, five or more print heads 110. The print head(s) 110 can be repositioned and/or reoriented on the print bar 108 with respect to one or more substrates, such that the print head(s) 110 eject ink (as directed by the controller device of the printing system 100) to print images on the substrate(s) as they move past the print head(s) 110. In some implementations, the print bar 108 is a print head stand on its own rollers, wheels or casters, allowing the print head stand 108 to be moved independently from the cabinet 102, which includes its own rollers, wheels or casters. Also, note that, as used herein, a "substrate" for printing is not necessarily a continuous substrate, but includes discrete packages and products, e.g., that move past the print head(s) 110 on a conveyor belt in a production and/or packaging line.

The printed images can include alphabetical and/or numeric characters, e.g., date codes or text serial numbers, barcode information, e.g., 1D or 2D barcodes, graphics, logos, etc. The controller device (not shown) includes electronics, which can include one or more processors that execute instructions (e.g., stored in memory in the electronics) to control the operation of the printing system 100. Suitable processors include, but are not limited to, microprocessors, digital signal processors (DSP), microcontrollers, integrated circuits, application specific integrated circuits (ASICs), logic gate arrays and switching arrays. The electronics can also include one or more memories for storing instructions to be carried out by the one or more processors and/or for storing data developed during operation of the printing system 100. Suitable memories include, but are not limited to, Random Access Memory (RAM), Flash RAM, and electronic read-only memories (e.g., ROM, EPROM, or EEPROM).

The substrate(s) can be labels that are added to products, packaging material for products (either before or after the product(s) are placed in the packaging), and/or surface(s) of the products themselves. For example, the substrate can be corrugated cardboard boxes containing one or more products. Thus, the print head(s) 110 can be repositioned and/or reoriented on the print bar 108 with respect to one or more product lines, including conveyor belt(s) and/or other product movement mechanism(s), that move products through a facility. The facility can be a product manufacturing facility, a product distribution facility, and/or other industrial/business facilities/buildings, and the product line can include a product packaging system, a product sorting system, and/or other product handling/management systems. As will be appreciated, the printing system 100 is only one example, and many other suitable structures can be used to construct a printing system that employs the print head systems and techniques described herein.

Figure 4A:
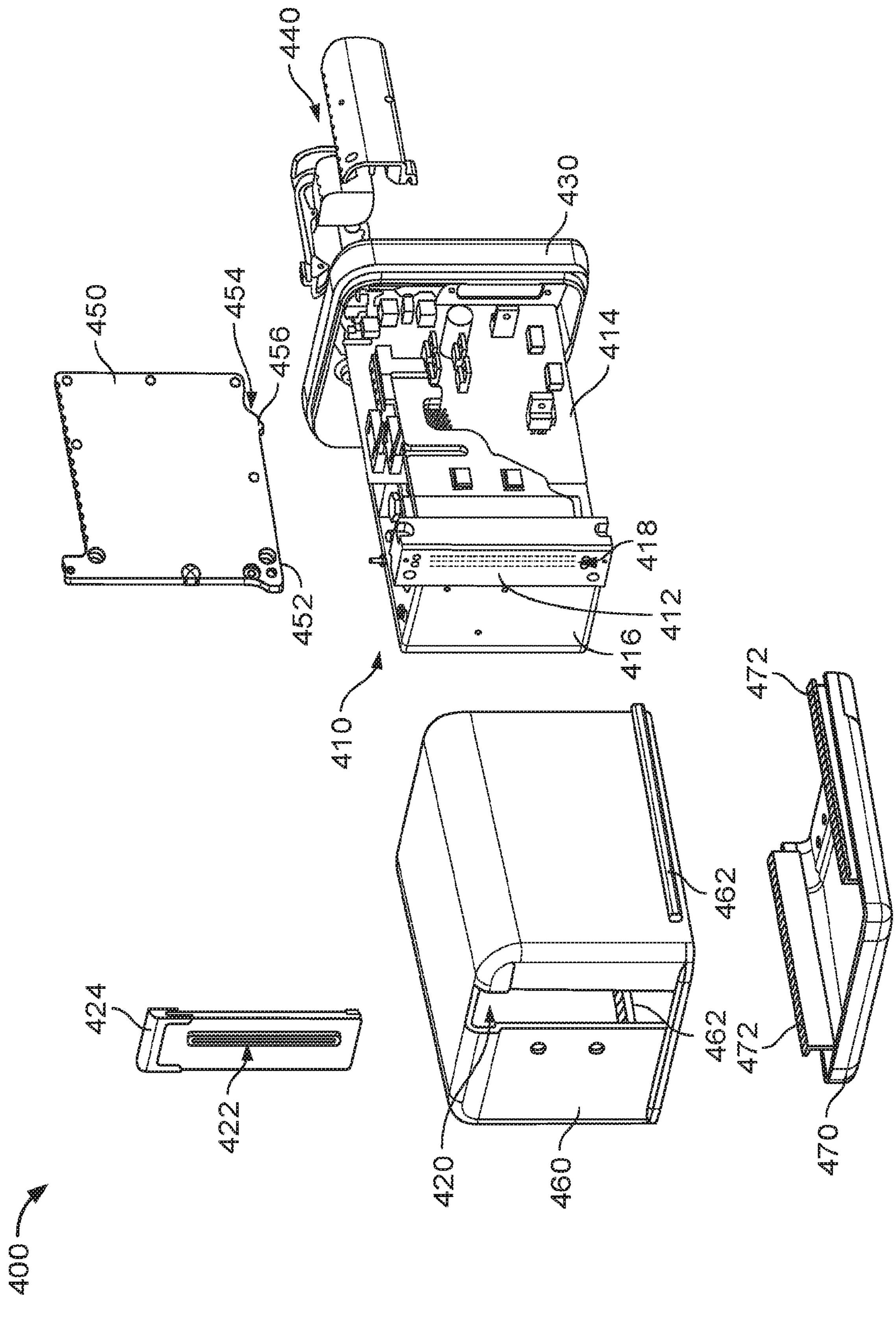
FIGS. 4A-4B show exploded views of an example of a print head, which can be used in the printing system of FIG. 1A or in other suitable printing systems.
Figure 4B:
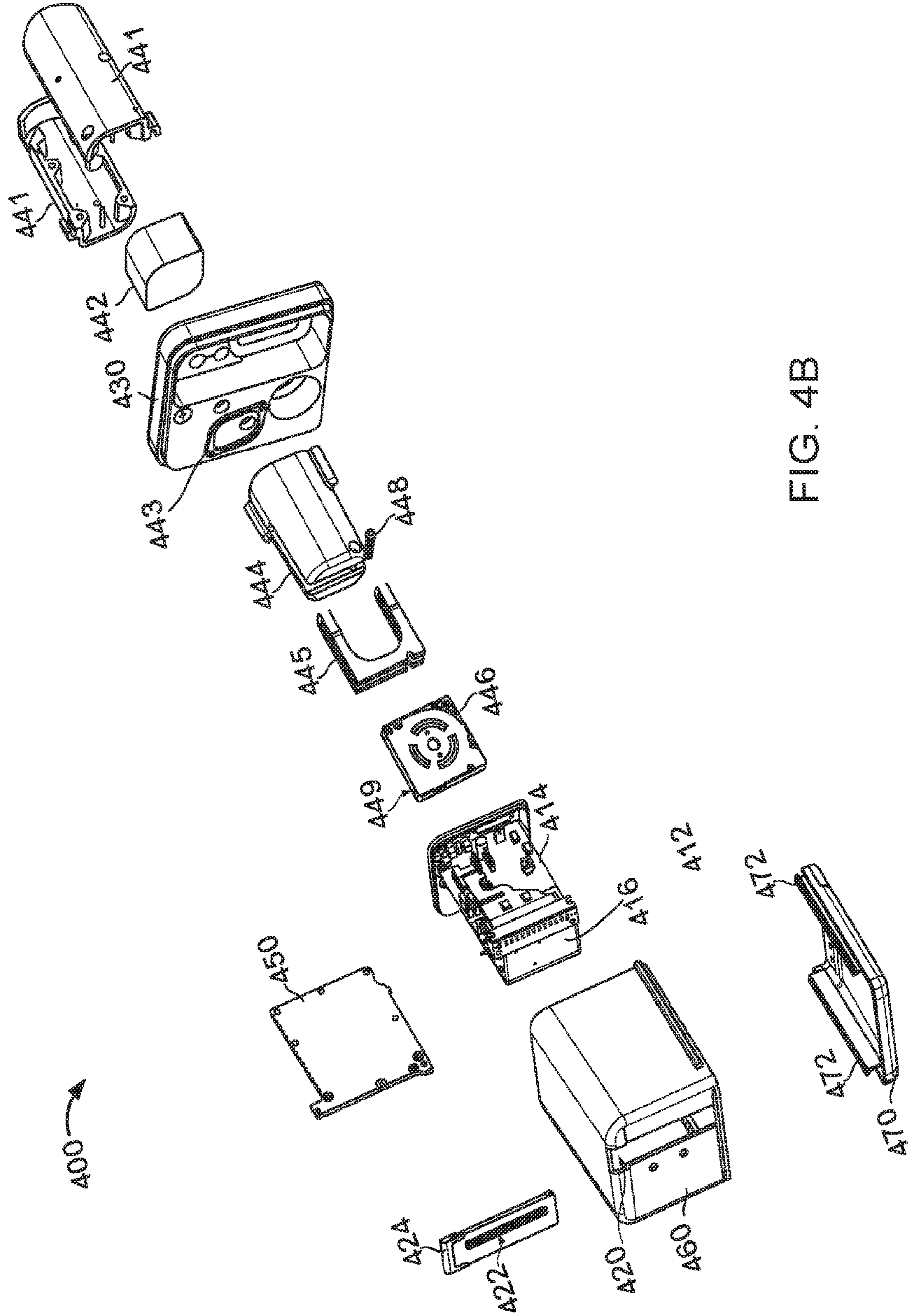

FIGS. 4A-4B shows an exploded view of an example of a print head 400, which can be used in the printing system 100 of FIG. 1A, as print head(s) 110, or in other suitable printing systems. The print head 400 includes a print engine 410 with a nozzle plate 412 and a print interface circuit board 414. The print interface circuit board 414 is an example of circuitry configured to selectively eject ink through multiple nozzles 418 in the nozzle plate 412, through an opening 420 of the printhead enclosure, to form an image on a moving substrate. The opening can be of various sizes and shapes, but should be in front of the nozzles 418, i.e., the opening 420 is located between the nozzles 418 and the substrate on which to print, to allow the selectively ejected ink to pass through the opening 420 when the selectively ejected ink is ejected toward the moving substrate.

The nozzle plate 412 and the print interface circuit board 414 can be the same as the corresponding nozzle plate and print interface circuit board components described in other embodiments in the present application, e.g., nozzle plate

Figure 1D:
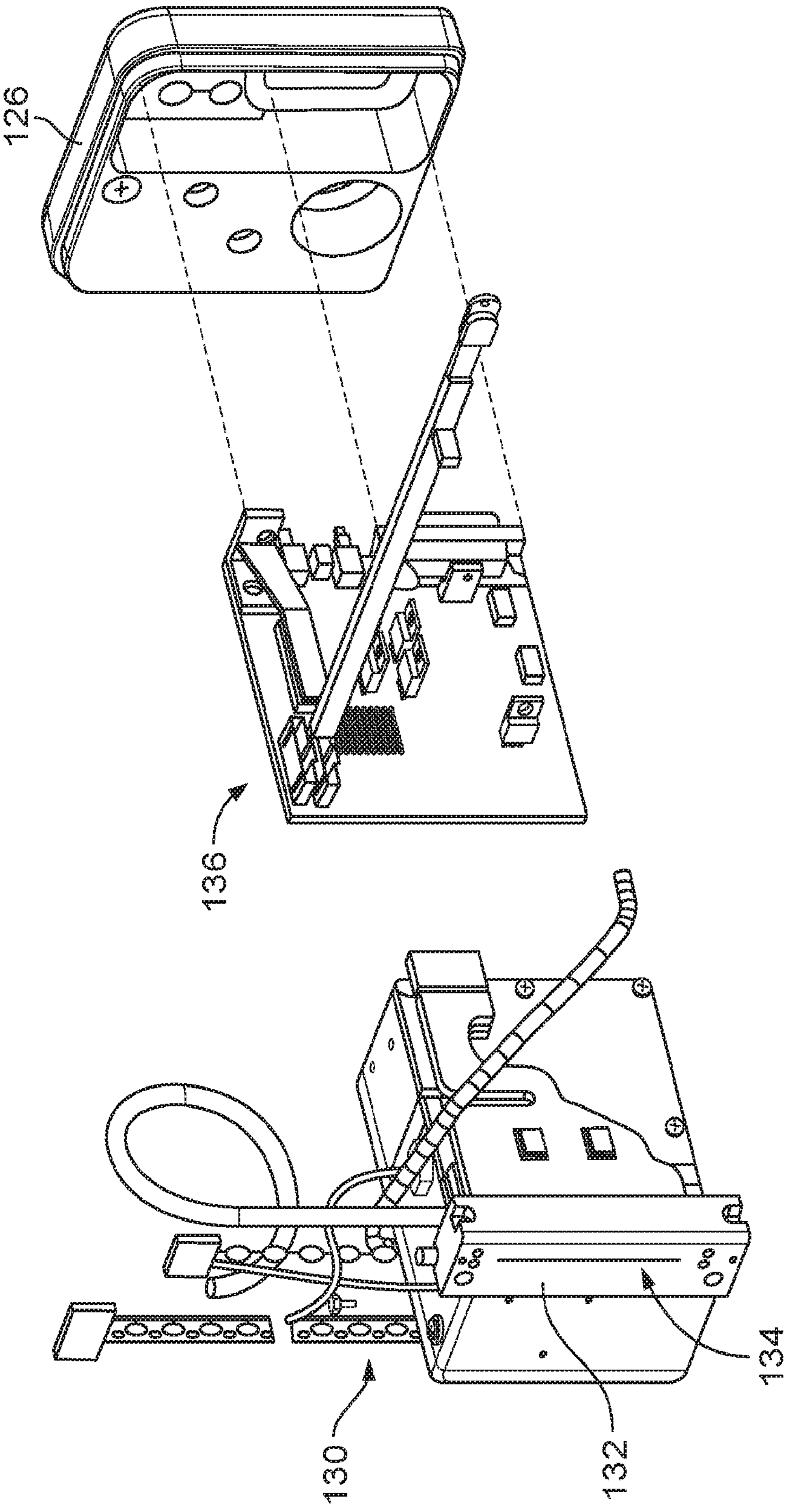
FIG. 1D shows an exploded view of a portion of the print head from FIG. 1B.
Figure 1F:
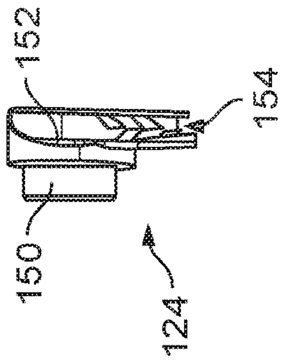
FIG. 1F shows a partial cutaway view of a fan assembly.
Figure 1E:
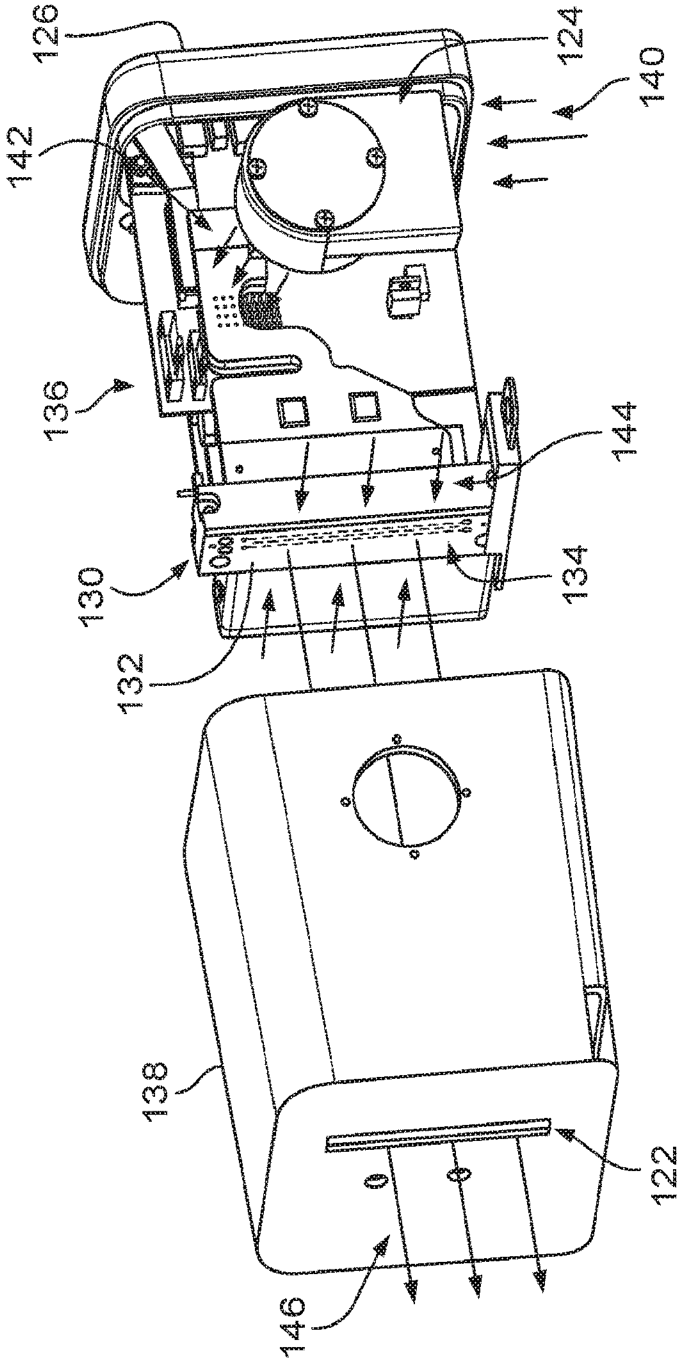
FIG. 1E shows a partially exploded view of the print head of FIG. 1B.
Figure 1G:
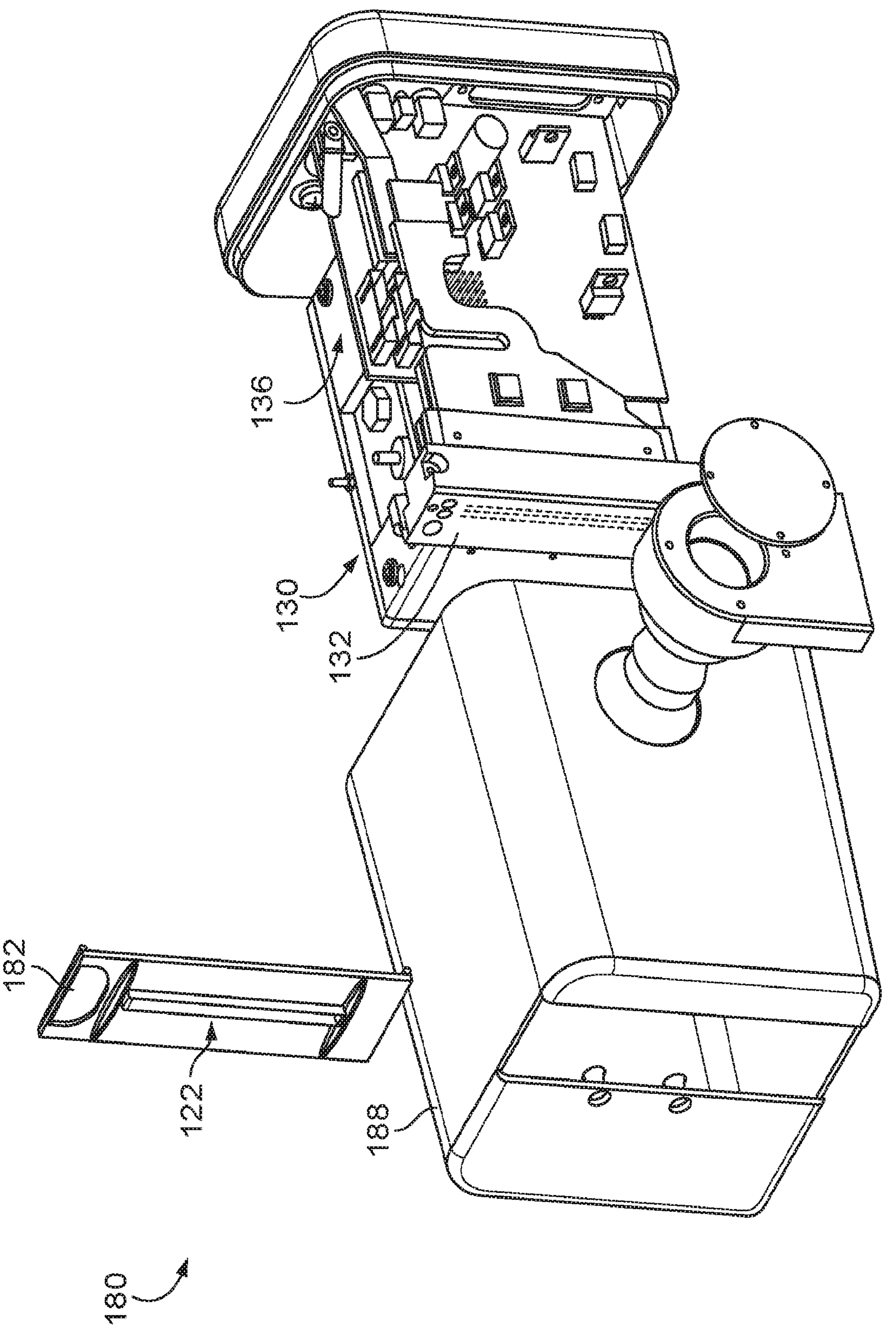
FIG. 1G shows a partially exploded view of another example of a print head, which can be used in the printing system of FIG. 1A or in other suitable printing systems.

132 and circuit board 136 from FIG. 1G. In addition, the print head 400 can include (or not include) other components of other embodiments of print heads described in the present application, such as a pressurized printhead enclosure, with an onboard pressure source, e.g., a fan assembly or blower assembly 440, and/or an input line for an external pressure source, e.g., shop air. Thus, the opening in front of the nozzles 418 can be a slot 422 that is aligned with the multiple nozzles 418. The slot 422 can be integral (integrally formed) with the printhead enclosure, e.g., slot 122 in FIG. 1E, or the slot 422 can be integral (integrally formed) with a separate piece 424 of the printhead enclosure as shown, e.g., separate piece 182 from FIG. 1G, where the integral slot or removable slot can include or not include the slot shape designs described in detail in this specification. Moreover, the print head 400 includes a back portion 430 of the printhead enclosure, which can be the same as back portion 126 in FIG. 1C, and/or the print head 400 can include other components.

In the example of FIG. 4A, the print engine 410 also includes an ink reservoir 416, which can be filled from an ink input line that passes through an ink line interface of the back portion 430, but in some implementations, an ink reservoir 416 is not included within the print head 400, and the ink is delivered directly to a jetting array 418 from an ink input line. Note that some implementations use liquid ink, which stays in liquid form at ambient temperature, and some implementations use phase change ink (also referred to as hot melt ink), which is solid at ambient temperature, but transitions to a liquid phase at an elevated temperature. In any case, the circuitry in the print head, e.g., print interface circuit board 414, is designed to purge the ink through the multiple nozzles 418, in accordance with instructions of a program, in response to a user pressing a purge button on the print head 400, or both. The printhead enclosure design can provide a small clearance (e.g., 1 millimeter) in front of the jetting array 418, which allows purged ink to drain into the bottom interior surface of the printhead enclosure with the help of gravity (and heat in the case of using a hot melt ink). Thus, the print head 400 includes components that facilitate the removal of ink that has been purged, e.g., from the ink reservoir 416, through nozzles 418 (in nozzle plate 412) and into an interior of the printhead enclosure.

Note that a purge is often recommended at the machine start up to remove air that may be trapped in the head due to thermal expansion and contraction, and a purge can also be performed periodically during operation of the print head. Moreover, different print heads will require different amounts and frequency of purging, depending on the type of ink and the rate of debris buildup. For example, using a pressurized printhead enclosure as described herein can substantially reduce debris buildup, resulting in less frequent need for purging and lower ink volumes during purging. Nonetheless, in some implementations, larger volumes of ink can be purged through the nozzles 418, and the example implementation shown in FIGS. 4A-4D is designed to handle larger ink flows during purging.

Purged ink flows (under the force of gravity) down the face of the nozzle plate 412 and onto an interior surface of a bottom portion of the printhead enclosure for the print head 400. In FIG. 4A, the printhead enclosure includes a separate top portion 460 and a separate bottom portion 470, where the bottom portion 470 connects with the top portion 460, e.g., using a slide or hinge mechanism, to form a front portion of the printhead enclosure, which is connected to the back portion 430 of the printhead enclosure.

Figure 4C:
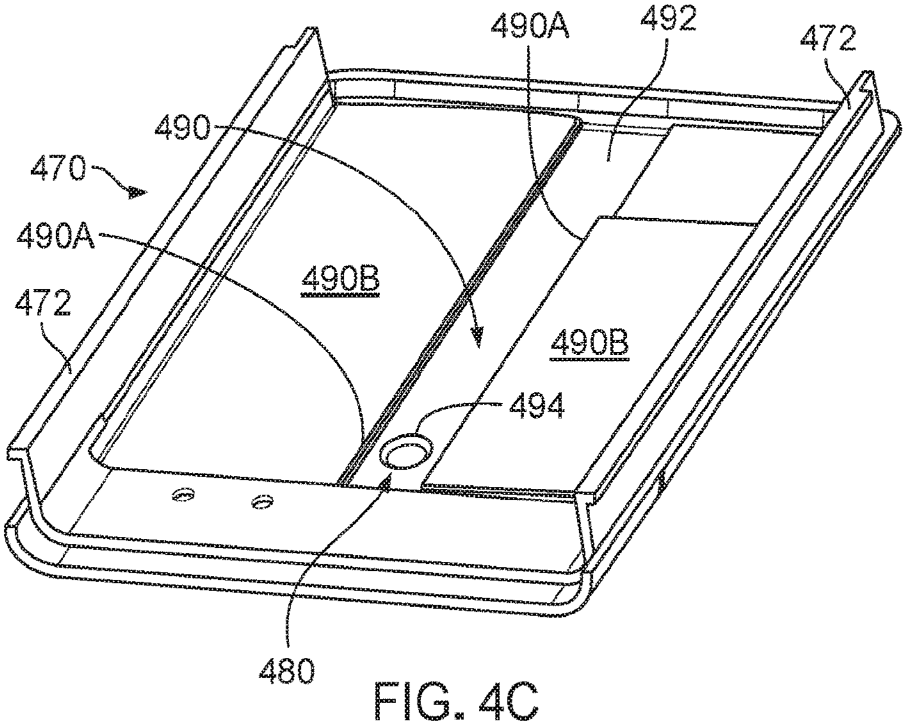
FIG. 4C shows a perspective view of a lower portion of the printhead enclosure from FIG. 4A.
Figure 4D:
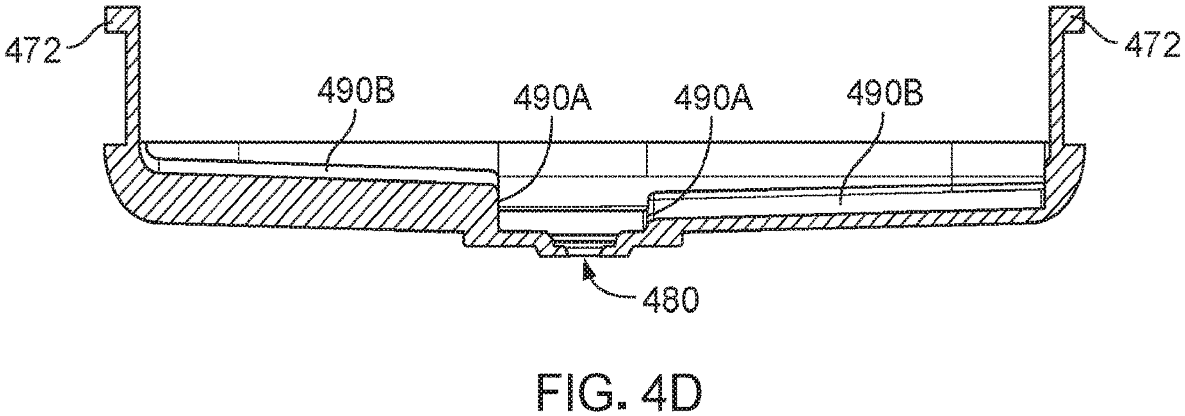
FIG. 4D shows a cross-sectional view of the lower portion of the printhead enclosure from FIG. 4A.

In the example shown, the bottom portion 470 includes tabs 472 that slide into and out of receiving slots 462 in an interior of the top portion 460 of the printhead enclosure. FIG. 4C shows a perspective view of the lower portion 470 of the printhead enclosure from FIG. 4A. FIG. 4D shows a cross-sectional view of the lower portion 470 of the printhead enclosure from FIG. 4A. However, these particular structures are not required. Other attachment mechanisms can be used to connect the pieces of the printhead enclosure, and a three piece enclosure is not also not required.

In some implementations, the top portion 460 and the bottom portion 470 are a single piece, such as described in further detail below. In some implementations, the bottom portion 470 and the back portion 430 are a single piece, forming a bottom portion of the printhead enclosure that nonetheless has a part of this portion located on top of the print head. Other two, three or more piece designs are possible. Note that all of these printhead enclosure portions, e.g., printhead enclosure portions 424, 430, 460, 470, can be manufactured using plastic injection molding systems and techniques. In some cases, the separate piece 424 is manufactured from a different material, such as metal. In addition, it should be noted that references to "bottom" and "top" herein are in relation to a given print orientation for the print head, which can have more than one print orientation when positioned with respect to a substrate, including the vertical jetting position shown in FIG. 4A, a horizontal jetting position, and a down jetting position, and rotational variations thereof, such as a forty five degree slant position. In a down jetting orientation, the separate piece 424 can be removed for purging, so the purged ink exits the printhead enclosure through the opening 120, rather than through the hole 480.

Nonetheless, having a top portion of the printhead enclosure that is readily separable from a bottom portion of the printhead enclosure can be advantageous in some implementations. Not all of the ink will flow out of the printhead enclosure, and using separable top and bottom pieces can facilitate cleaning and maintenance of the print head. In particular, hot melt ink readily solidifies and adheres to interior bottom sections of the printhead enclosure. For liquid inks the bottom portion can remain in place as an ink tray thus preventing spilling ink when opening the print head.

When the print head cools down, the hot melt ink solidifies and could seal the printhead enclosure to one or more other components within the print head, such as the ink reservoir 416, thus making it difficult to take the print head apart for cleaning and maintenance. Using a design with a separate top piece 460 allows the top piece to be readily removed, e.g., slid off in the example shown, allowing ready access to the print engine 410 and its parts for servicing even when the hot melt ink has frozen a portion of the print engine 410 to part of the bottom portion of the printhead enclosure. Nonetheless, due to the use of a heating component, as described in further detail below, the ink will be allowed to empty from the print head over time when heated, and the level of hot melt ink within the printhead enclosure will not get high enough to contact the top portion 460 and prevent the top portion 460 from being removed for service.

Regardless of whether liquid ink or phase change ink is used, the inside bottom surface of the printhead enclosure can define a channel 490, where the channel 490 is angled with respect to a horizontal plane of a print orientation of the print head to cause the purged ink to flow through the channel 490 to the hole 480. Thus, the channel 490 has a higher end 492 located under the nozzles 418, and lower end 494 located at the hole 480, and the printhead enclosure is structured to direct the purged ink to the hole 480 through which the ink flows and exits the printhead enclosure.

Note that, although the hole 480 is shown as being circular, many different shapes are possible, including oval, square, rectangular, hexagonal, etc. In addition, many variations are possible for the angling of the bottom surface that directs the purged ink to the hole 480 and for the channel 490. The angle of the surface can be a one degree angle. Other angles are also possible, provided the angle is steep enough to cause the ink to flow to the hole 480 under the force of gravity. For example, the angle can be less than one degree, e.g., between 0.25 and one degree, for some types of inks. Larger angles are also possible, such as angles between one and five degrees (inclusive), angles between one and ten degrees (inclusive), angles between one and fifteen degrees (inclusive), angles between one and twenty degrees (inclusive), angles between one and twenty five degrees (inclusive), and angles between one and thirty degrees (inclusive).

In addition, the channel 490 can be formed by, or be associated with, various structural features that help direct the purged ink in the appropriate manner. For example, one or more steps 490A and/or one or more sloped surfaces 490B (forming an angled wedge) can be used to help direct ink into the channel 490. Side draft angles on surfaces 490B can be utilized to prevent ink from wicking on to the bottom surface of the printhead array 418, which can then create a path of least resistance for the purge ink to be drained underneath the heated reservoir 416. Side draft angles can ensure minimal ink buildup in the enclosure and allows for easy removal of the enclosure when the system is shut down.

Other shapes, such as one or more wedge shapes in place of steps 490A, can be used to form the channel 490. In implementations that employ phase change ink, these shapes can help direct the ink toward a component, e.g., a heated edge 452 of a heating wall 450, that is positioned along the inside surface of the printhead enclosure, where this component is heated so as to keep the phase change ink on the inside surface of the printhead enclosure melted and flowing toward the hole 480. For example, the heating wall 450 can be a heating wall for the ink reservoir 416 that includes a portion 454 that extends beyond a bottom surface of the ink reservoir 416. Using an extended heating wall of the ink reservoir 416 has the advantage of keeping costs for the print head lower, as additional component(s) need not be added to the print head; the same heater (not shown) that heats the wall 450 for the ink reservoir also provides the heat to keep the hot melt ink flowing to the hole 480. But other heating components can be used to heat the ink, such as a separate metal structure that is connected with the heater for the ink reservoir 416 or with its own heater, if two different temperatures are needed.

Regardless of what type of structure is used as the heating component though, the heating component is positioned along the inside surface of the printhead enclosure at a distance from the inside surface of the printhead enclosure that is small enough (as determined by the phase change ink) that the phase change ink stays melted under the component, along a channel to the hole, when the component is heated. In some implementations, this heating component also includes a portion, e.g., portion 456, that extends into the hole 480 to ensure that the phase change ink stays melted as the phase change ink passes through the hole 480.

In addition, the hole 480 is preferably placed a good distance away from the nozzle plate 412, such that the ink flows out of the print head 400 at a point that is relatively distant from the substrate, i.e., the hole 480 is spaced away from the production or packaging line. In some implementations, the hole 480 is located in a back half of the printhead enclosure opposite the opening 420. In some implementations, the hole 480 is located in a back quarter of the printhead enclosure opposite the opening 420, as shown in FIG. 4C. In some implementations, the hole 480 is located as close to the back edge of the back portion 430 as possible. Note that keeping the drip hole 480 farther away from the front of the print head 400 facilitates placing the print head 400 further over the components of the production and/or packaging line (e.g., a conveyor belt) and as far down as possible.

Furthermore, although the channel 490 structures described need not be used with a separately removable top portion 460 of the printhead enclosure, as shown in FIGS. 4A-4D, using such a two-piece (or three or more piece) design for a printhead enclosure that includes the channel 490 can be advantageous for manufacturing purposes, as making a one-piece design for a front portion of the printhead enclosure that includes such additional structural shapes can be challenging due to the manufacturing limitations of making the part through an injection molding process. In addition, in some implementations, a channel can still be effectively formed even when no defined shapes are added to the printhead enclosure to create a channel 490, and thus a single front piece can readily be used for the printhead enclosure.

Figure 4E:
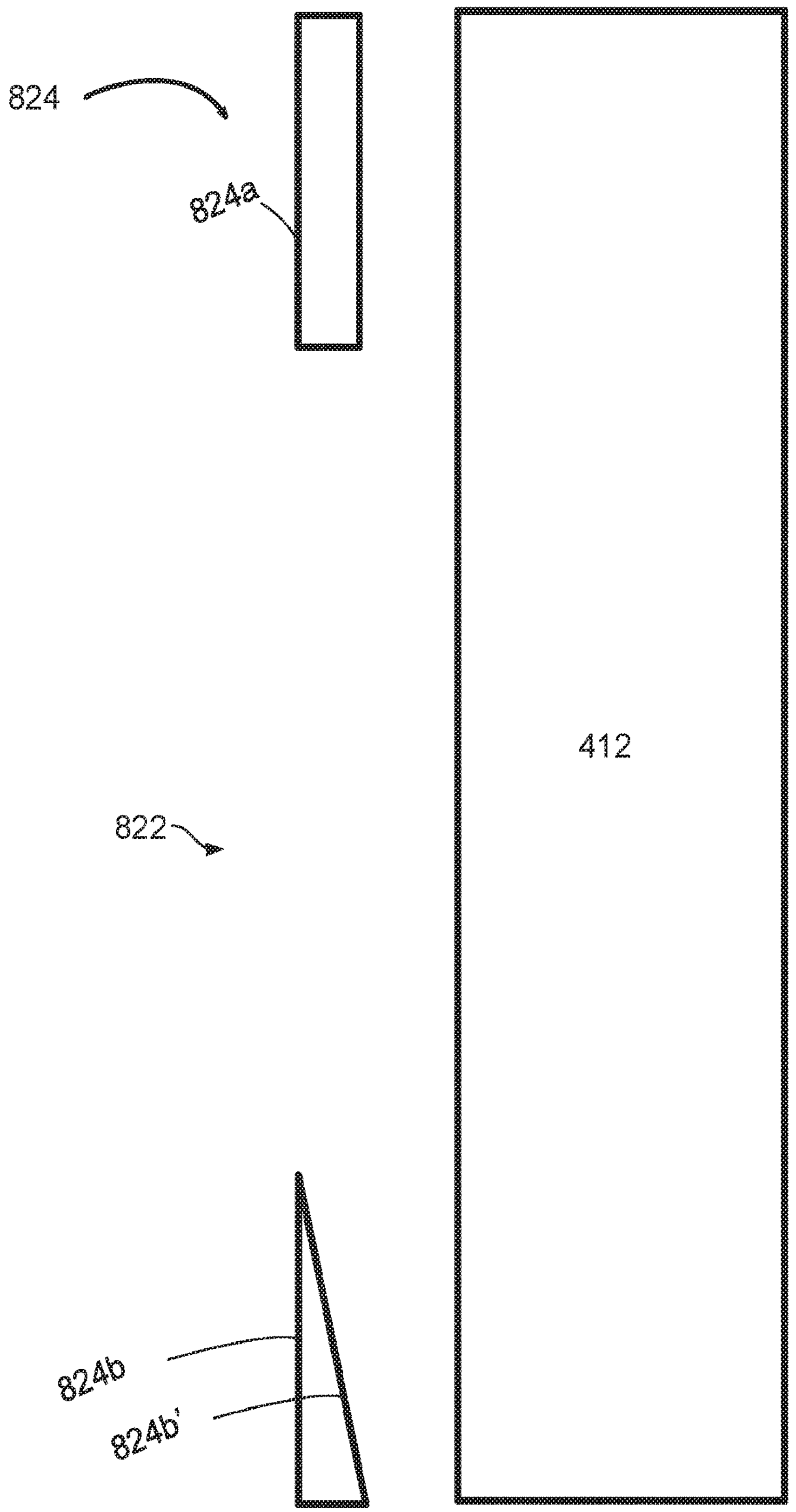
FIGS. 4E-4F show a cross-sectional view of an example separate piece including a slot and a sloped surface.
Figure 4F:
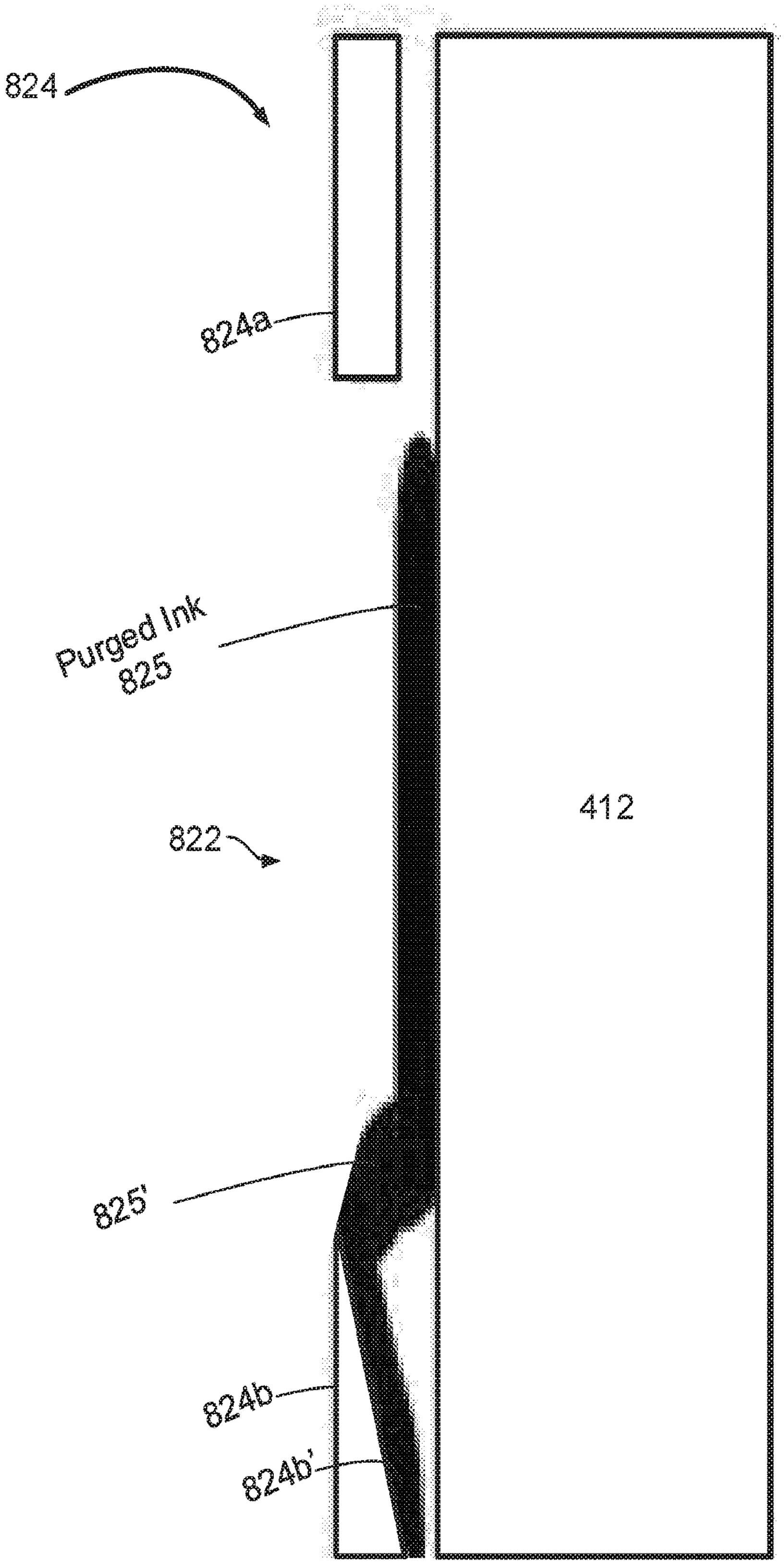

FIGS. 4E-4F show a cross-sectional view of an example separate piece 824 including a slot 822 and a sloped surface. As shown, the separate piece 824 includes a first section 824*a* and a second section 824*b* that are proximate to the slot 822 and define the boundaries of the slot 822. The second section 824*b* includes a sloped surface 824*b*' extending from an edge of the slot 822 towards the nozzle plate 412 of the print head 400 shown in FIGS. 4A-4B. The shape of the second section 824*b* is configured to direct flow of the purged ink 825 towards the bottom portion 470 of the print head 400, and prevent buildup 825' of the purged ink 825 from exiting through the slot 822. Although the implementation illustrated in FIGS. 4E-4F show the second section 824*b* as including a specific wedge-type shape, the second section 824*b* can be designed to form different types and dimensions of angles, chamfers, radii, wedges, and/or slopes. In some implementations, one or more features of the separate piece 824 (e.g., the sloped surface of the second section 824*b*) are included in other separate pieces described in this specification, such as the separate piece 424 described previously with reference FIGS. 4A-4B, the separate piece 182 described previously with reference to FIG. 1G, and the separate piece 504 described later with reference to FIG. 5A. In some implementations in which a slot is integral with the printhead enclosure, the sections 824*a*, 824*b* can describe sections of portions of the printhead enclosures that are proximate to the slot, such as the top portion 460 described previously with reference to FIG. 4A and the front portions 138, 500 described with reference to FIG. 1B and FIG. 5A. Accordingly, although the implementation described with respect to FIGS. 4E-4F are illustrated as being used with the print head 400 of FIGS. 4A-4B, one or more features of the separate piece 824 are, in some implementations, used with other print heads described in this specification.

Furthermore, although the implementations illustrated in FIGS. 4E-4F describe the second section 824*b* as being proximate to the edge of the shorter dimension of the slot 822, in some implementations that include a print head in a horizontal jetting orientation, the second section 824*b* can be proximate to the edge of the longer dimension of the slot

822. In implementations that include a print head that can be used in both vertical jetting orientations and horizontal jetting orientations, the second 824*b* can describe sections proximate to both of: at least one longer dimension edge and at least one shorter dimension edge.

Figure 5A:
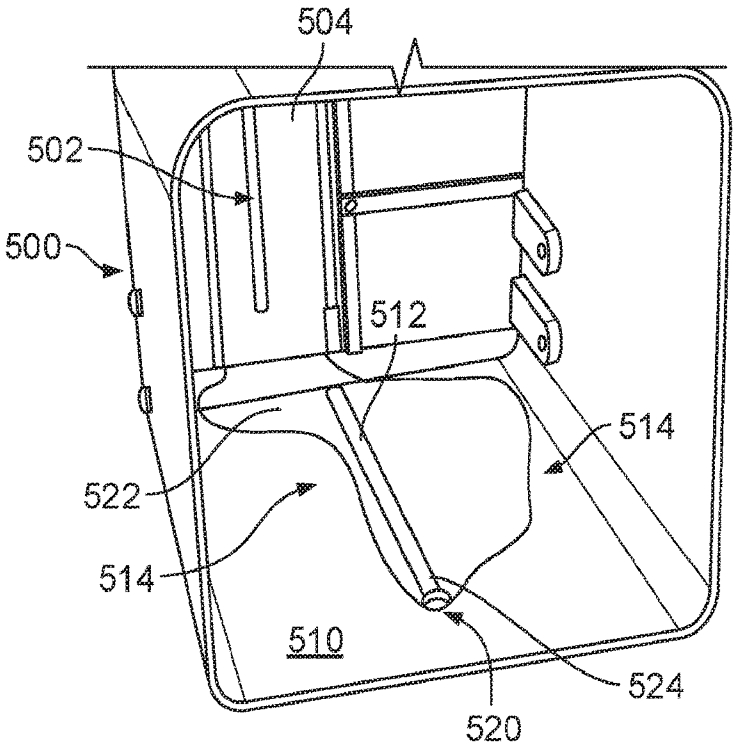
FIG. 5A shows an example of a front portion of another printhead enclosure, which can be used for a print head in the printing system of FIG. 1A or in other suitable printing systems.

FIG. 5A shows another example of a front portion 500 of a printhead enclosure, which can be used for a print head in the printing system 100 of FIG. 1A, as print head(s) 110, or in other suitable printing systems. The front portion 500 includes an opening 502 that is integral (integrally formed) with a separate piece 504 of the printhead enclosure, e.g., the same as separate piece 424 from FIG. 4A or the separate piece 182 from FIG. 1G. In addition, the front portion 500 includes an inside surface 510, which is flat (i.e., no manufactured channel) but is also angled with respect to a horizontal plane of a print orientation of the print head to cause the phase change ink to flow to a hole 520, e.g., the same as hole 480.

As shown, the front portion 500 of the printhead enclosure has been removed after a purge of hot melt ink, and a channel 512 has formed from a quantity 514 of the phase change ink that spreads away from the heating component along the inside surface 510 of the printhead enclosure and solidifies beyond a certain distance from the heating component. Note that this distance depends on the properties of the phase change ink and the heat given off by the heating component. In any case, phase change ink inside the enclosure that is not adjacent to a heated surface freezes, which can create an ink dam around the area of the molten ink creating a natural channel along the outside edges of the heated area.

Figure 5B:
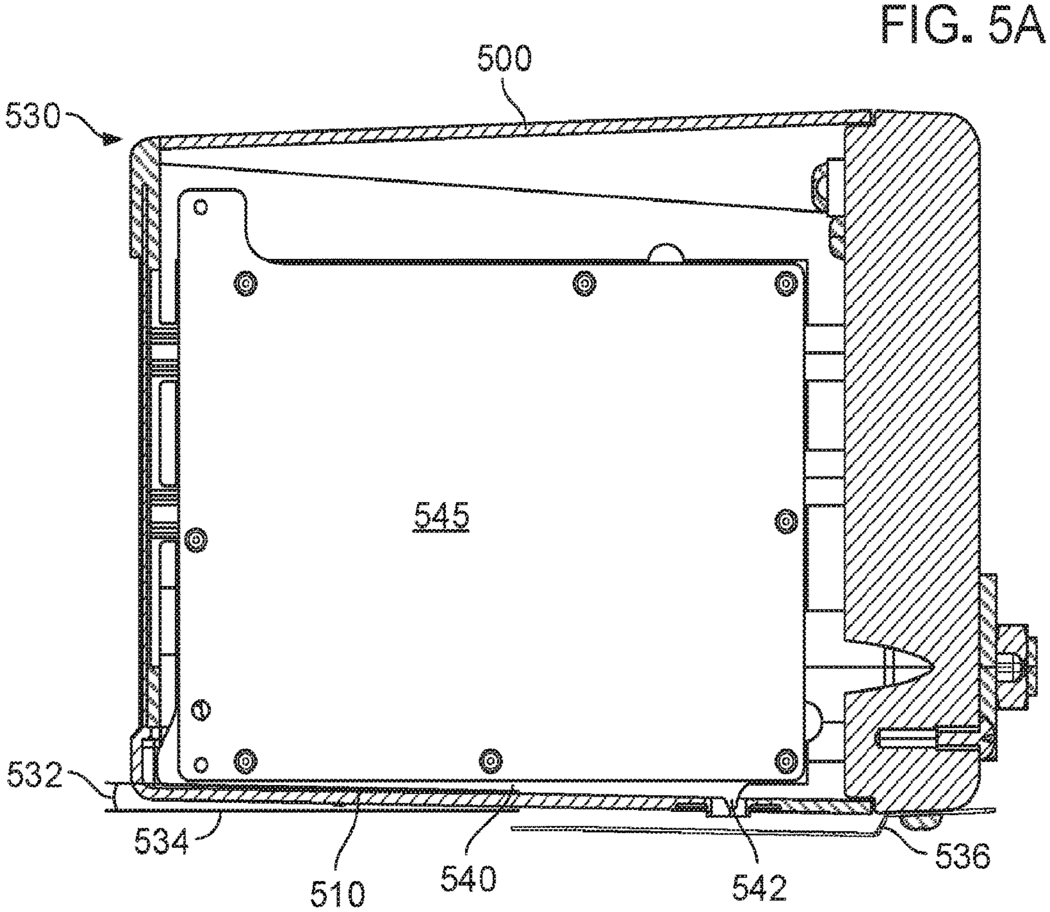
FIG. 5B shows a cross-sectional side view of the print head with the front portion of the printhead enclosure from FIG. 5A.

FIG. 5B shows a cross-sectional side view of a print head 530 with the front portion 500 of the printhead enclosure from FIG. 5A. As shown, the inside surface 510 is very close to a heating component 540, which in this example is an extended portion of a heating wall 545 for an ink reservoir. The distance between the inside surface 510 and the bottom edge of the heating component 540 is small enough that the phase change ink stays in contact with both the heating wall 545 and the inside surface 510 of the printhead enclosure 510 along the channel 512, when the phase change ink is melted, until the phase change ink passes through the hole 520. As with the heating wall 450, the heating wall 545 can extend beyond a bottom surface of the ink reservoir with which the heating wall 545 is attached, and not much of an extension 540 is needed to facilitate using the printhead enclosure to catch the purged ink and remove the purged ink from the print head 530, thus keeping the overall dimensions of the print head 530 small.

In addition, not much of an angle 532 (from the horizontal plane 534) is needed for the ink to naturally flow (when melted) under the force of gravity along the inside surface 510 from a higher end 522 located under the multiple nozzles to a lower end 524 located at the hole 520. In this example, the angle 532 of the inside surface 510 of the printhead enclosure with respect to the horizontal plane 534 of the print orientation of the print head 530 is a one degree angle. Other angles are also possible, provided the angle is steep enough to cause the ink to flow to the hole 520 under the force of gravity. For example, the angle can be less than one degree, e.g., between 0.25 and one degree, for some types of inks. Larger angles are also possible, such as angles between one and five degrees (inclusive), angles between one and ten degrees (inclusive), angles between one and fifteen degrees (inclusive), angles between one and twenty degrees (inclusive), angles between one and twenty five degrees (inclusive), and angles between one and thirty degrees (inclusive). Further, in this example, the extended heating wall 545 is slightly angled on its bottom to match the draft angle of the enclosure (e.g., 1°), and so the extended heating wall 545 provides an edge for the ink to follow, i.e., the molten ink tends to wick along the edge of the extended wall 545. Thus, the dimensions of the heating wall 545 in relation to the surface 510 ensures heated contact between the ink and the extended heated wall 545 edge.

Figure 5C:
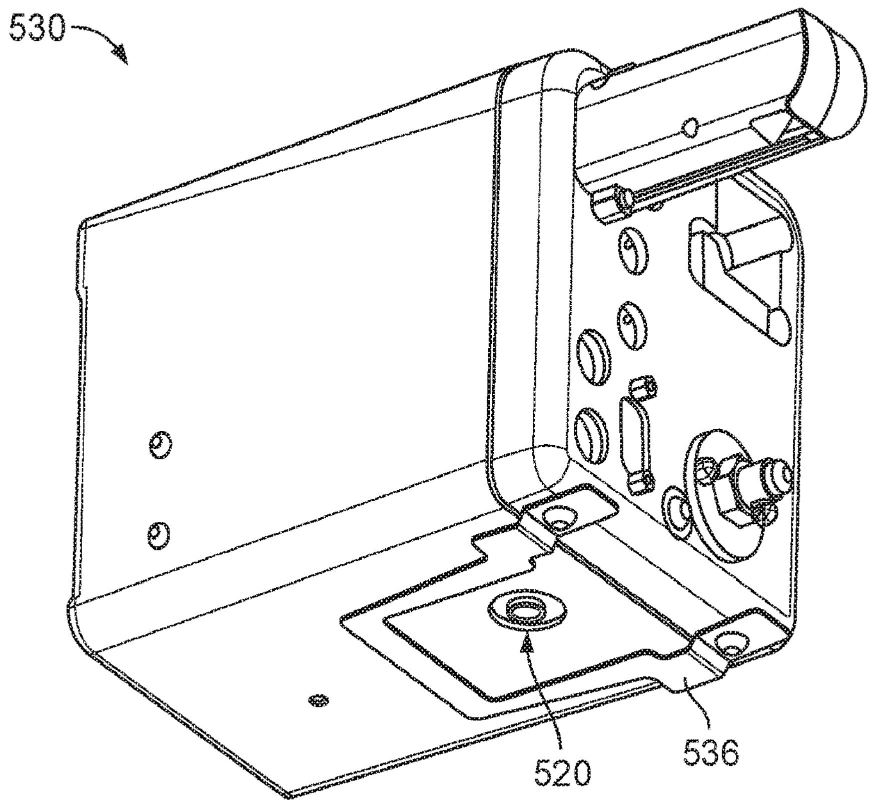
FIGS. 5C & 5D show perspective views of the print head of FIG. 5B, with and without a cup to catch ink that exists the printhead enclosure.
Figure 5D:
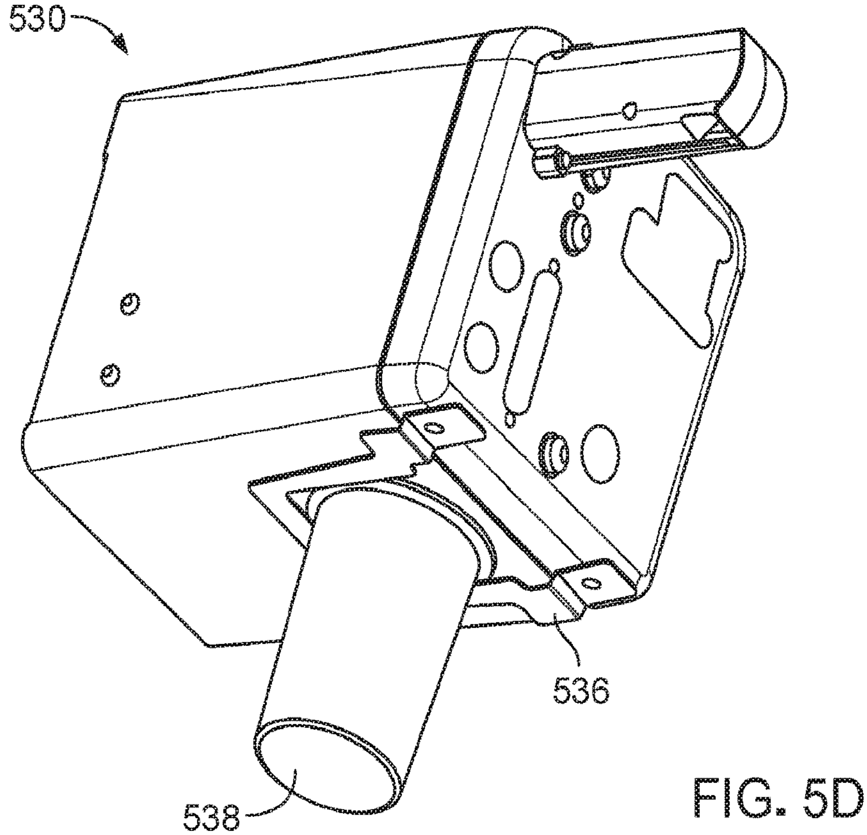

Moreover, the heating component 540 can include a portion 542 (e.g., like portion 456 in FIG. 4A) that extends into the hole 520 to keep the phase change ink melted as the phase change ink passes through the hole 520, and the print head 530 can include a bracket 536 to hold a container to catch the ink that passes through the hole 520. FIGS. 5C & 5D show perspective views of the print head 530 of FIG. 5B, with and without a cup 538 to catch ink that exits the printhead enclosure. Note that the bracket 536 is positioned such that the cup 538 is readily removed by sliding the cup 538 away from the front of the print head 530, thus allowing replacement of the cup 538 without any interference with items placed near the front of the print head 530, such as production and/or packaging line components (e.g., a conveyor belt) or other components (e.g., umbilical cables).

Moreover, when used in combination with the pressurized printhead enclosure designs described in this application, the bracket 536 and cup 538 design is advantageous. The size of the hole 520 can be small enough (and is preferably small in the case of hot melt ink to ensure the ink can remain heated and will not solidify before it exits the print head) that the hole will not impact the nozzle air flow needed for the pressurized printhead enclosure designs. Further, the cup 538 that is located on the outside bottom of the enclosure is removably fixed proximate to the enclosure hole using the bracket 536, which further obstructs air from leaking and having an impact on the pressurized printhead enclosure.

In some implementations, a small diameter cup 538 is used so the hot melt ink flows to the edge of the cup before it freezes, and the entire volume of the cup can be filled before it needs replacing (as determined by the properties of the phase change ink in relation to the ambient temperature around the print head). For example the cup 538 can be an off-the-shelf 3 oz (89 cc) cup (e.g., made from clear plastic to make it easy to determine when the cup should be replaced). In other implementations, a deeper container can be used (even when the diameter is kept small) to provide more time between cup replacements. In other cases, a larger container, such as a pan or a bucket, can be placed on the floor or a table under the ink exit hole, providing greater flexibility in the type of container used and how often it need be replaced.

Figure 5E:
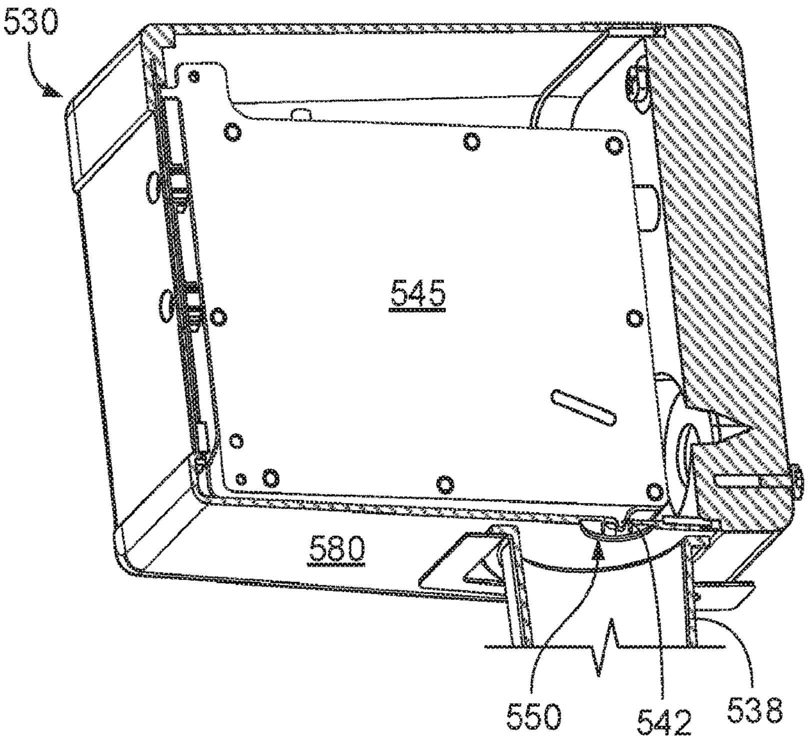
FIGS. 5E-5G show additional cross-sectional views of the print head from FIG. 5B.

Furthermore, a heated component (e.g., the portion 542 of the heating component 540 in FIG. 5B) can extend into the hole 520 to keep the phase change ink melted as the phase change ink passes through the hole 520 and into the cup 538. FIG. 5E shows a perspective cross-sectional view of the print head 530 from FIG. 5B. In this example, the portion 542 of the heating wall 545 for the ink reservoir extends part way into the hole, which is surrounded by a protrusion 550 placed in the bottom side 580 (in the printing orientation) of the printhead enclosure for the print head 530, above the cup 538.

Figure 5F:
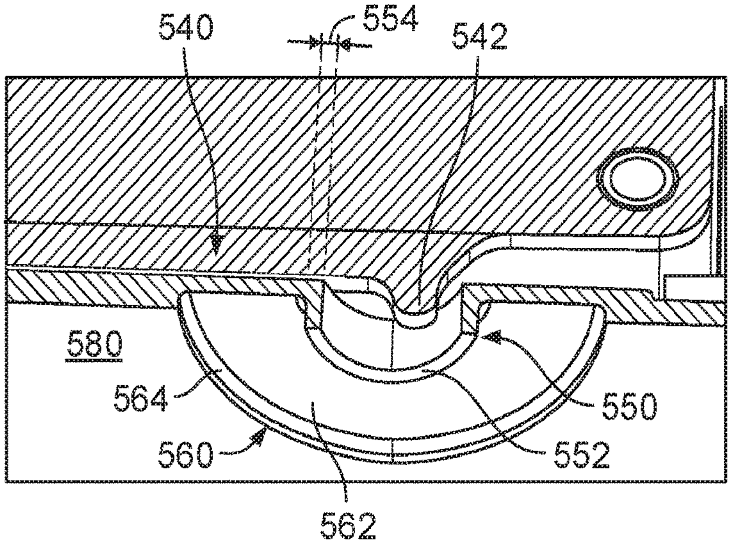

FIG. 5F shows a closer, perspective cross-sectional view of the protrusion 550. As shown, the protrusion 550 is circular, has a lower surface 552, and has a width 554, but as with the hole itself, different shapes are possible for the protrusion 550. Note that many variations are possible for the protrusion and drip edge(s) at the hole, as described in detail below, and these variations are equally applicable to liquid inks, which have no need of a heated portion 542 to keep the ink melted at the hole. In general, a protrusion at the hole should extend below an outer bottom surface of the printhead enclosure (in the print orientation) far enough to prevent ink from wicking onto the outer bottom surface of the enclosure, and potentially spreading out from the protrusion on the underside of the print head. In addition, a drip edge of the protrusion should have a surface portion below the outer bottom surface of the printhead enclosure (in the print orientation) that is small enough that gravitational force overcomes surface tension of the ink at the surface portion of the protrusion (as determined by the viscosity of the ink).

In the example shown in FIG. 5F, the protrusion 550 is located within a counter bore 560 in the bottom side 580 of the printhead enclosure for the print head 530. The protrusion 550 includes a surface portion 552 that has a width 554 that is small enough (e.g., one millimeter) to create an effective drip edge, i.e., gravitational force overcomes surface tension of the ink at the surface portion 552 of the protrusion 550. The protrusion 550 extends below a bottom surface 562 of the counter bore 560; the surface 562 is also a bottom surface of the print head 530. Using a counter bore 560 provides an additional edge 564 to ensure that no ink gets onto the main bottom surface 580 of the printhead enclosure for the print head 530. Thus, the counter bore 560 forms a pocket in the bottom side 580 of the printhead enclosure for the print head 530 that completely surrounds the protrusion 550. This design can simplify the manufacturing process, thus making the printhead enclosure easier and less expensive to produce.

Figure 5G:
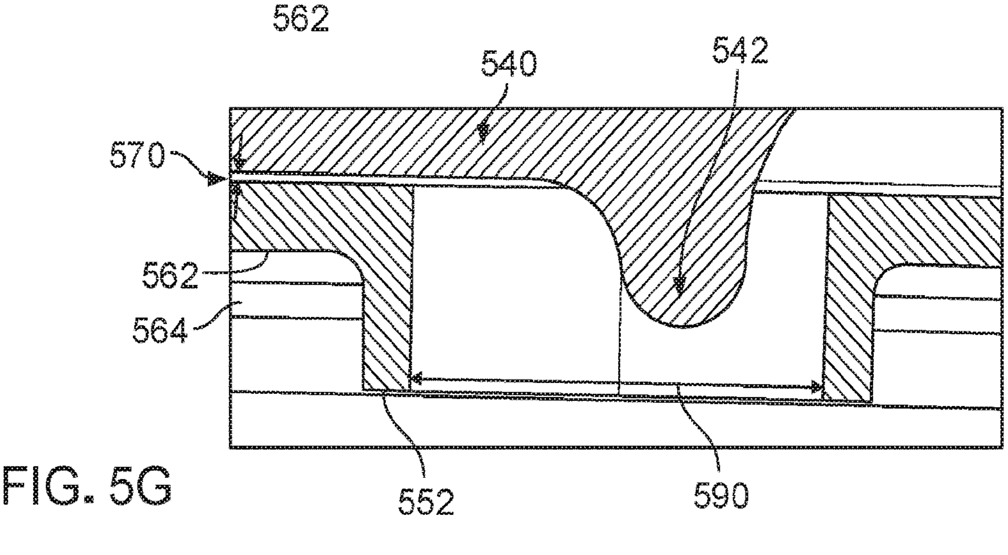

Note that the protrusion 550 extends below the bottom surface 562 of the print head 530, which is not at the same height as the bottom surface 580, as a result of the counter bore 560. FIG. 5G shows cross-sectional, mostly side-on view of the protrusion 550 and counter bore 560 of FIG. 5F. As shown, a distance 570 between the heating component 540 and an interior surface of the bottom side 580 of the printhead enclosure is very small, e.g., [0.1-0.5] millimeters, which facilitates the flow of the phase change ink from inside the print head 530. Moreover, some implementation do not require any gap 570, the heating component 540 can be located so that it touches the enclosure, causing the molten ink to flow along the edges of the heating component 540 to the hole. A larger gap 570 is also possible, as the hot melt ink can solidify on the bottom of the enclosure while a molten channel nonetheless forms in the ink and continues to direct the ink along the molten channel to the hole 520.

The diameter 590 of the hole 520 can be [5-9] millimeters, e.g., 7 millimeters, and should be sized to ensure there is enough room for the ink to exit the hole and remain near the heated drip point 542. The surface portion 552 of the protrusion extends below the bottom surface 562, e.g., by 2 millimeters, and also past the edge 564 and below the main bottom surface 580 of the printhead enclosure. Use of the protrusion 550 in combination with the heated portion 542 ensures that hot melt ink cannot build up around the hole, cool and the block the hole.

The portion 542 of the heating component 540 extends into the hole far enough to keep the phase change ink melted as it drips off the drip edge 552. In the example shown, the portion 542 of the heating component 540 extends at least half way into the hole, but it will be appreciated that the size, placement and extent of the portion 542 can be varied, depending on the properties of the phase change ink. Nonetheless, it is preferable to not have the portion 542 extend all the way through the hole, and past the bottom edge 552 of the protrusion 550, as this can create a risk of injury if someone were to place their finger over the hole; thus, the bottom edge 552 of the protrusion 550 can extend at least one millimeter past a bottom most portion of the heated tab 542 to isolate the heated drip point from the outside enclosure surface. In general, the portion 542 of the heating component 540 is shaped and sized to guide the phase change ink into the hole and prevent ink drops on the outside of the hole from freezing, as frozen drips hanging from the hole would obstruct the hole. The ink must remain molten until it is fully through the hole where the force of gravity can pull the ink away from the hole. Note that the shape and size of the portion 542, as shown, can serve as another drip edge, so ink can drip off the portion 542 in addition to dripping off the edge 552. Moreover, the size of this portion or tab 542 can be made to keep a small gap between the portion/tab 542 and the interior surface of the hole 520, which reduces the amount of air that can flow out of the print head in the case of using a pressurized printhead enclosure, as described in this application.

In addition, other designs for the hole, protrusion and drip edge are possible, with or without the use of a phase change ink. Thus, the heating component 540 is not required for the use of a protrusion and drip edge, as described. In addition, variations of the edge 564 are also possible, including the creation of a pocket that does not surround the protrusion.

Figure 6A:
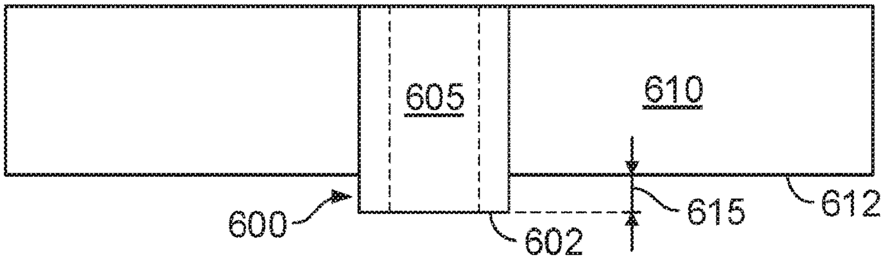
FIGS. 6A-6D show examples of drip edge protrusions.

FIG. 6A shows an example of a drip edge protrusion 600. A hole 605 passes through a wall 610 of a printhead enclosure, and the protrusion 600 has a lower edge 602 that extends beyond an outer bottom surface 612 of the enclosure wall 610 by a distance 615 (e.g., by 2 millimeters) that is sufficient to ensure that the ink passing through the hole 605 (and dripping off the edge 602) does not wick back onto the outer surface 612. However, the protrusion need not actually protrude such that it increases the total height of the printhead enclosure.

Figure 6B:
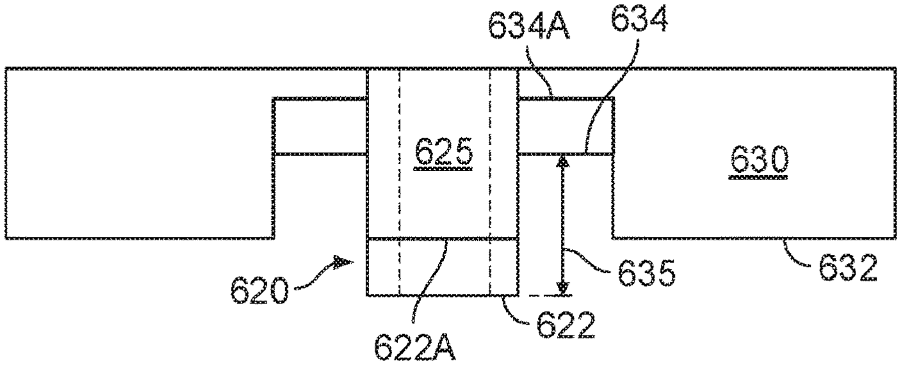

FIG. 6B shows another example of a drip edge protrusion 620. A hole 625 passes through a wall 630 of a printhead enclosure, and the protrusion 620 has a lower edge 622 that extends beyond an outer bottom surface 632 of the enclosure wall 630. But the lower edge 622 also extends beyond an outer bottom surface 634 by a distance 635 (e.g., by 2 millimeters) that is sufficient to ensure that the ink passing through the hole 625 (and dripping off the edge 622) does not wick back onto the outer surface 634. This is an example of the counter bore implementation, where the lower edge 622 extends beyond the outer bottom surface 632 of the enclosure wall 630 by 1 millimeter, e.g., the wall 630 is 2 millimeters thick, the counter bore is 1 millimeter deep, and the protrusion 620 is 2 millimeters long. But if the enclosure wall 630 is thick enough, the lower edge 622 need not extend beyond the outer bottom surface 632 of the enclosure wall 630.

If the surface 634 instead becomes surface 634A by making a deeper counter bore in the enclosure wall 630, then the lower edge 622 can be flush with (or even recessed within) the outer bottom surface 632 of the enclosure wall 630, as the counter bore depth can provide the needed distance to prevent the ink drops from wicking back onto the outer bottom surface. Moreover, the counter bore creates a pocket that provides a secondary edge to collect ink that could otherwise spread away from the drip hole 625. Other designs are also possible to prevent ink drops from travelling along the outer bottom surface of the enclosure and spreading or dripping in random places.

As noted above, the protrusion does not need to be cylindrical and can take on different shapes and angles. The protrusion can be oval, square, rectangular, hexagonal, etc., or irregular shapes. In general, the shape of the protrusion for the hole on the bottom of the enclosure should be designed to keep the ink in a drop shape and not travel along the bottom of the enclosure. The outside of the exit hole can thus have a narrow edge which protrudes below at least one bottom surface of the enclosure. Using a narrow edge minimizes surface tension between the ink drop and the edge of the hole so the drop will not cling to the exit hole. Protrusion of the narrow edge prevents the draining ink drop/stream from traveling along the bottom of the enclosure.

Figure 6C:
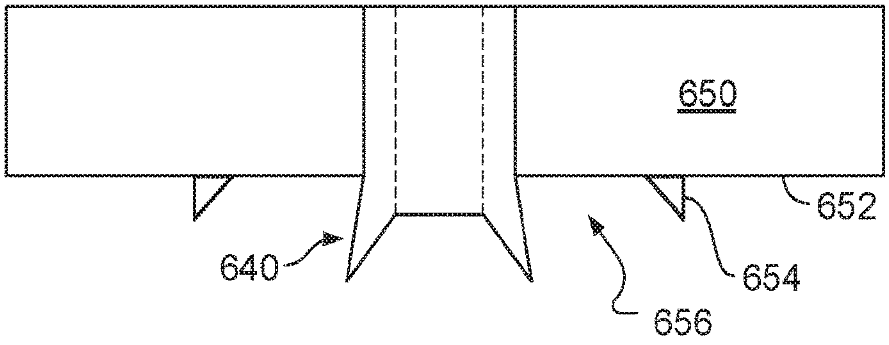
Figure 6D:
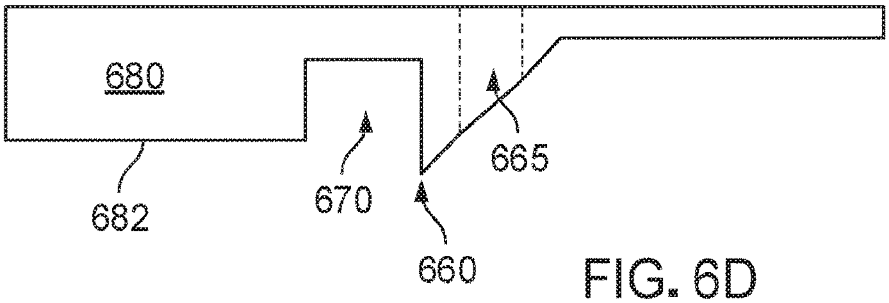

FIG. 6C shows another example of a drip edge protrusion 640. As shown, in addition to extending the protrusion 640 by a distance away from the printhead enclosure 650, a very narrow edge is used to facilitate the formation of drops that will quickly drop off the protrusion 640 and not wick back onto a bottom surface 652 of the enclosure wall 650. As an added precaution, an additional drip edge 654 can be included as a backup to the protrusion 640, forming a pocket 656 to capture any ink that might not drop cleanly from the protrusion 640. Other approaches to the protrusion and drip edge design are also possible, including ones that are not circular or even symmetrical. FIG. 6D shows another example of a drip edge protrusion 660, which includes a slant within a hole 665. The protrusion 660 is cut on an angle resulting with a drip edge at two different heights. Moreover, a pocket 670 can be added to the enclosure wall 680, as needed, to prevent wicking of the ink back onto a bottom surface 682 of the enclosure wall 680.

As noted above, a print head in accordance with the present disclosure can have more the one print orientation. Thus, the structures used to remove purged ink from inside the print head can be used with respect to more than one bottom interior surface of the printhead enclosure. This applies to both implementations that remove liquid ink and implementations that remove phase change ink from a print head. Thus, all of the vertical jetting orientation implementations described above can be implemented as horizontal jetting orientation implementations, either separate from or together with vertical jetting orientation implementations.

Figure 7A:
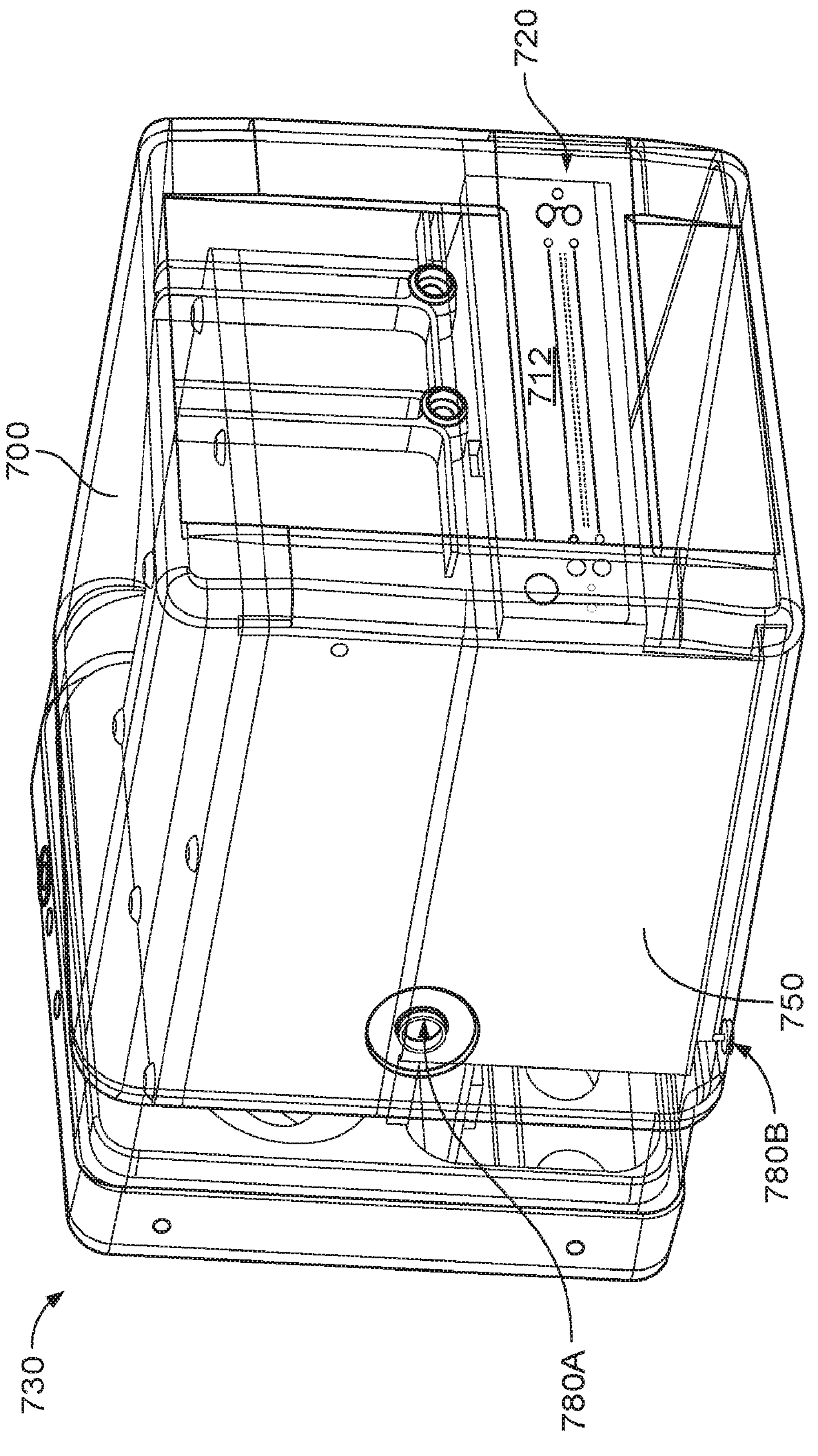
FIG. 7A shows a perspective view (with transparency) of another example of a print head, which can be used in the printing system of FIG. 1A or in other suitable printing systems.
Figure 7B:
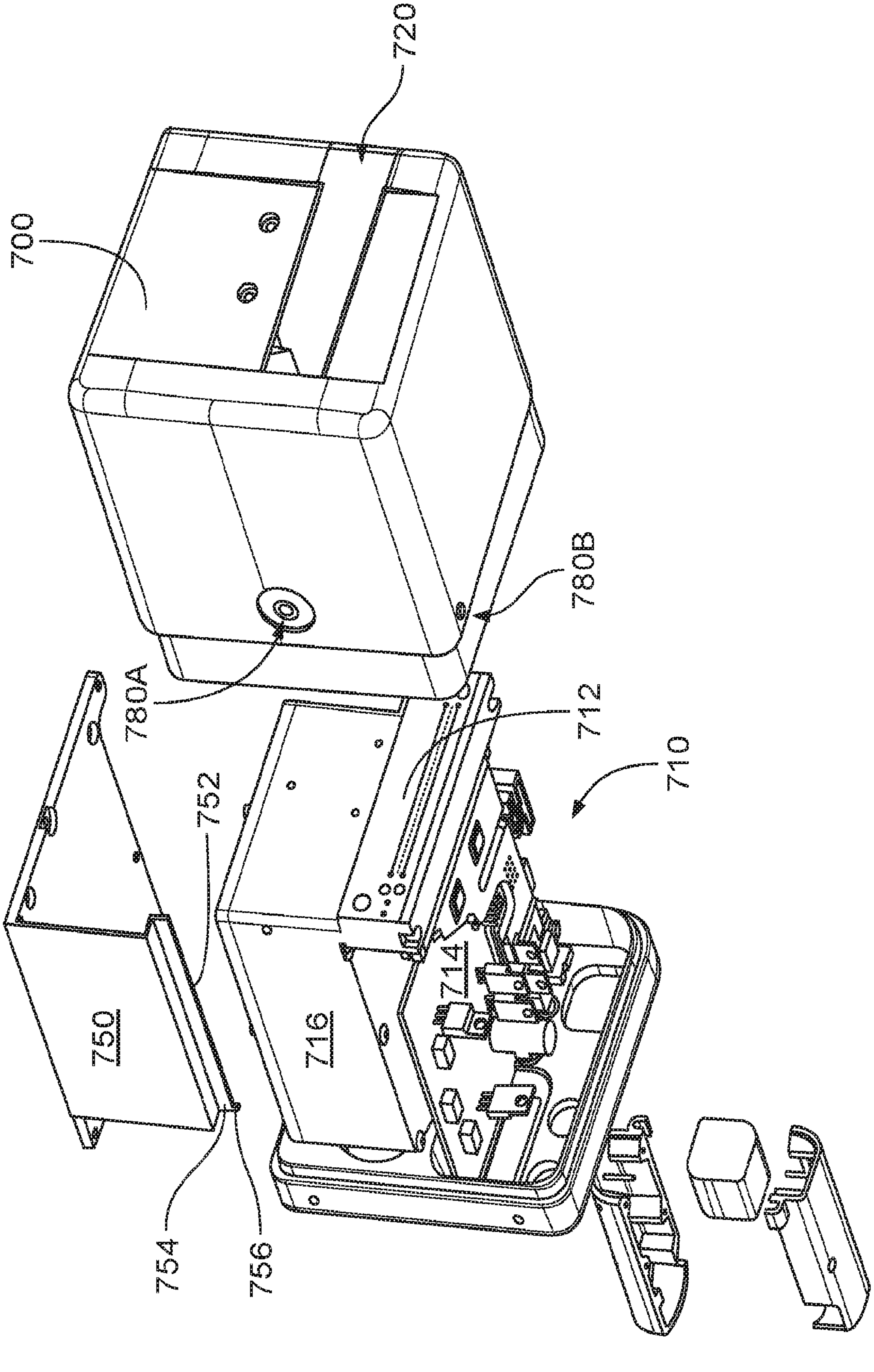
FIG. 7B shows an exploded view of the print head from FIG. 7A.

In a combined implementation, the hole is a first hole in a first inside surface of the printhead enclosure, and the printhead enclosure includes a second hole in a second inside surface of the printhead enclosure, along with other corresponding components for the given implementation, such as the protrusion and drip edges, the channel, and/or the heating component. FIG. 7A shows a perspective view (with transparency) of another example of a print head 730, which can be used in the printing system 100 of FIG. 1A, as print head(s) 110, or in other suitable printing systems. FIG. 7B shows an exploded view of the print head from FIG. 7A.

The print head 730 includes a front portion 700 of the printhead enclosure, which includes a hole 780A, which can include a drip edge protrusion and counter bore, as shown. Further, the print head 730 includes a print engine 710, with jetting array 712, circuit board 714 and ink reservoir 716, which are the same as the corresponding components described above. The jetting array 712 is shown with an opening 720 in the printhead enclosure, but as before, this opening 720 can be designed to receive a separate piece with a slot therein, or the opening 720 can be a slot that is integrally formed with the printhead enclosure 700. Thus, the print head 730 can also be implemented using the pressurized printhead enclosure systems and techniques described.

Further, as the print head 730 is to be operated in a side jetting configuration (horizontal jetting orientation), the draft angle of the printhead enclosure parallel to the length of the jetting array 712, along with a modified heating wall 750, can be used to direct the ink to the exit hole on the rear end of the enclosure. Note that the heating wall 750 provides a heating component 754, which in this example is an extended portion of the heating wall 545 for the ink reservoir 716. This heating component 754 is sized and positioned so as to have a distance between an edge 752 and the inside surface of the printhead enclosure 700 that is small enough that the phase change ink stays in contact with both the heating wall 750 edge 752 and the inside surface of the printhead enclosure 700 along a channel (structurally formed in the enclosure 700 or formed by an ink dam) when the phase change ink is melted, until the phase change ink passes through the hole 780B. Moreover, the heating component 754 can include a portion 756 (e.g., like portion 542 in FIG. 5B or portion 456 in FIG. 4A) that extends into the hole 780B to keep the phase change ink melted as the phase change ink passes through the hole 780B.

As before, the hole 780B can use the protrusion and drip edge structures described above. Also, these structures can be used with liquid inks, where no heating component 754 is needed. Further, in the case of liquid inks, one or more channel structures can be added to the inside bottom (with respect to the side orientation) surface of the printhead enclosure 700 to direct the ink to the hole 780B, such as described above in connection with FIGS. 4C and 4D. Moreover, the print head embodiments described above can be implemented in combination with a pressurized printhead enclosure, such as described in detail below.

FIG. 1B shows an example of a print head 120, which can be used in the printing system 100 of FIG. 1A, as print head(s) 110, or in other suitable printing systems. The print head 120 includes a fan assembly 124 (e.g., a DC axial fan/blower) that connects with a printhead enclosure, which has a back portion 126 and a front portion 138 that connect to form an internal airspace within the print head 120. This internal airspace is pressurized by the operation of the fan assembly 124, which blows air from the exterior environment into the internal airspace of the print head 120. Due to the pressure difference, this air then passes out of the printhead enclosure through a slot 122 located in the front portion 138, as described in further detail below. The positive air pressure prevents dust particles from entering the printhead enclosure, thus preventing dust particles from landing on the nozzle plate.

FIG. 1C shows a back-side view of the print head 120 from FIG. 1B. The back portion 126 of the printhead enclosure provides openings through which input/output interfaces 128 for the print head 120 protrude, while maintaining the pressurized internal air space. These input/output interfaces 128 can include an ink line interface to receive ink (e.g., from the ink reservoir in cabinet 102), a low vacuum interface to receive a first vacuum level used to prevent ink weeping from the print head 120 by lightly drawing on ink in a reservoir in the print head, and a high vacuum interface to receive a second vacuum level used to pull air out of the ink through a semi-permeable material in the print head 120. Note that while some implementations use the fan assembly 124 to push air into the internal airspace of the print head 120, as described further below, other implementations pressurize the internal airspace of the print head 120 using an input line (e.g., from shop air) that connects to one of the interfaces 128.

Additional interfaces 128 to the print head 120 can also be used. These can include user interfaces, such as a jet test button and an ink purge button. These can also include one or more electronic interfaces to connect with control electronics within the print head 120. The control electronics can include one or more processors that execute instructions (e.g., stored in memory in the control electronics) to control the operation of the print head 120. Suitable processors include, but are not limited to, microprocessors, DSP, microcontrollers, integrated circuits, ASICs, logic gate arrays and switching arrays. The control electronics can also include one or more memories for storing instructions to be carried out by the one or more processors and/or for storing data developed during operation of the print head 120. Suitable memories include, but are not limited to, RAM, Flash RAM, and electronic read-only memories (e.g., ROM, EPROM, or EEPROM).

In some implementations, the electronics of the print head 120 are divided between two components that connect with each other, which provides flexibility for upgrades. FIG. 1D shows an exploded view of a portion of the print head 120 from FIG. 1B. The control electronics are divided between a print engine 130 and a print interface circuit board 136. The print engine 130 includes a nozzle plate 132, which has nozzles 134 through which the ink is selectively ejected by the print engine 130 to form an image. The print engine 130 and the print interface circuit board 136 connect together to form the internal structure of the print head 120.

FIG. 1E shows a partially exploded view of the print head of FIG. 1B. As shown, the print engine 130 and the print interface circuit board 136 are connected together, and the back portion 126 of the printhead enclosure is attached. The front portion 138 of the printhead enclosure is offset from the other components to show how air flows through the print head when the front portion 138 is attached to the back portion 126 of the printhead enclosure. The fan assembly 124 draws in 140 air from the environment and pushes 142 that air into the internal airspace of the print head. The air passes 144 in front of the nozzles 134 in the nozzle plate 132, and then the air passes 146 out of the print head through the slot 122. Note that the airflow through the slot 122 (as well as other examples of the slot described throughout this application) can occur all the time while the printer is powered up to ensure that dust is not landing on the face plate between prints, as well as during prints.

FIG. 1F shows a partial cutaway view of the fan assembly 124. A fan mount portion 150 includes the fan, and a filter 152 removes dust particles from the air that is blown into the print head 120. In addition, the fan assembly 124 can include features 154 at the air intake to reduce the chances of dust particles from entering the air flow prior to the filter 152. The features 154 can include louvers or angled fins of various shapes and sizes, which can be define a tortuous path (or be turned or twisted) and placed at the air intake to reduce the chances of dust particles from entering the air flow prior to the filter 152. As will be appreciated, various types of fan assemblies and various internal configurations are possible for a print head constructed according the systems and techniques described herein, such as the blower assembly described below in connection with FIGS. 1H and 1I. In general, the printhead enclosure will be configured to contain a pressurized airspace at least in front of the nozzles 134 of the print head, and the slot 122 will be aligned with the nozzles 134 to allow the selectively ejected ink to pass through the slot 122.

However, regardless of whether an onboard pressure source (e.g., fan assembly or blower assembly 124) or an external pressure source (e.g., shop air from an air compressor provided through an interface 128) is used, it should be noted that diffusion of the air, to ensure even pressure distribution from the pressure source inside the printhead enclosure, is a significant factor in maintaining good print quality with higher air flow rates through the slot. To address this issue, internal structures in the print head 120 should provide enough obstruction to diffuse the flow path of the air from the pressure source, such that the air flow is even around all sides of the nozzle plate 132.

Air can be diffused by deflection off multiple surfaces within the print head 120, which can include components of the print interface circuit board 136. For example, the airflow input to the print head 120 (either from fan assembly 124 or from shop air) can be directed into the printhead enclosure from the side, as shown in FIG. 1E, rather than from the back, and then impact existing components on the print interface circuit board 136. However, the input direct (from the side, the back, or other) is not critical. Rather, the effect of the air impacting the components within the printhead enclosure is important. In some implementations, the components include one or more of baffles, perforated plates, protrusions, nubs, and/or differently shaped objects designed to diffuse the air entering the printhead enclosure to equalize pressure levels throughout the printhead enclosure to provide even flow distribution of the air coming out of the slot. For example, the internal air diffuser can be design based on the specific pressure source used and how the air enters the printhead enclosure.

Such configurations facilitate maintaining jet straightness even as the pressure level and the outflow air flow increases significantly. Thus, using a diffused airflow configuration allows the air flow rates to be increased substantially without negatively impacting print quality since there is a more uniform velocity profile across the nozzle plate throughout its length at higher air flow rates. In other words, the printhead enclosure is pressurized without introducing a direct velocity path of air between the inlet and the slot 122, thus providing even velocity distribution across the nozzle plate.

In addition, the slot 122 can have various shapes and sizes, as described in further detail below. In some implementations, the slot 122 is integral with the printhead enclosure, e.g., the slot 122 is formed at the same time as the front portion 138 of the printhead using injection molding techniques). In some implementations, the slot 122 is added to the printhead enclosure as a separate piece. This separate piece can include a slide or hinge mechanism to open the front of the enclosure to gain access to the nozzle plate. It may be necessary after a cold start up to perform a small purge to remove air from the ink channels behind the nozzles and insure all nozzles are firing. In this case it would be advantageous to open the front of the enclosure to wipe away the purge ink.

FIG. 1G shows a partially exploded view of another example of a print head 180, which can be used in the printing system of FIG. 1A or in other suitable printing systems. The print head 180 can include the various components described herein, including a print engine 130 with a nozzle plate 132, a print interface circuit board 136, and a fan assembly 124. However, the slot 122 is not integral with a front portion 188 of the printhead enclosure, but rather is included on a separate piece 182, which can include a slide or hinge mechanism to open the front of the enclosure to gain access to the nozzle plate 132. In the example shown, the separate piece 182 slides into and out of receiving slots in the front portion 188 of the printhead enclosure.

This design allows for the slot 122 to be slid out of the way in the event that a purge is needed and the user needs to allow for the purged ink to not build up inside the printhead enclosure. It also allows for the user to wipe ink away from the nozzle plate 132. Note that a purge is often recommended at the machine start up to remove air that may be trapped in the head due to thermal expansion and contraction. Other mechanisms for removing purged ink from within the printhead enclosure are also possible, such as a slide out catch tray for the purged ink, or the purge handling systems and techniques described in connection with FIGS. 4A-7B. Other variations are also possible, such as replacing the fan assembly 124 with the blower assembly 440 from FIG. 4A.

Figure 1H:
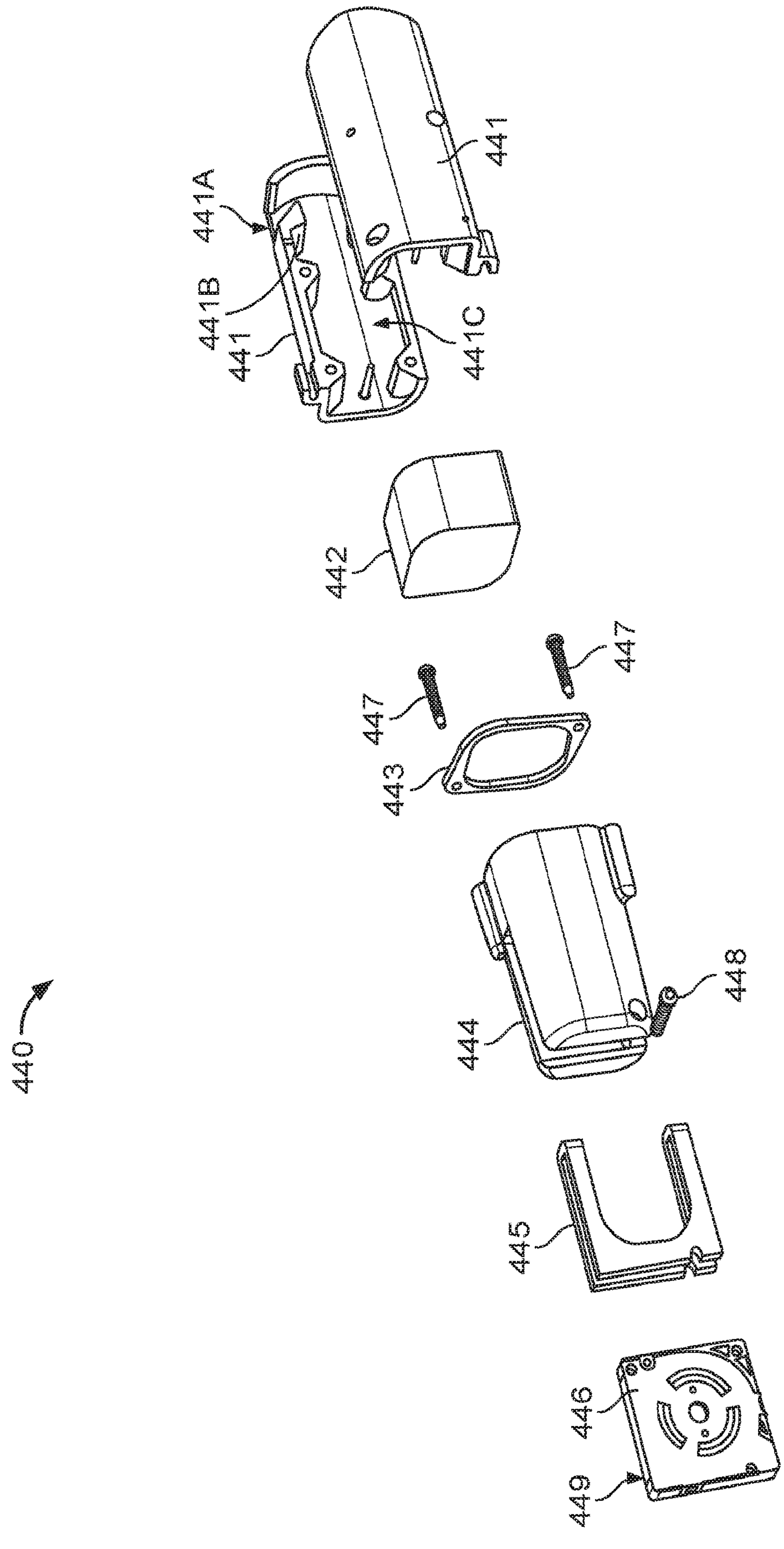
FIGS. 1H and 1I show exploded perspective views of an example of a blower assembly.
Figure 1I:
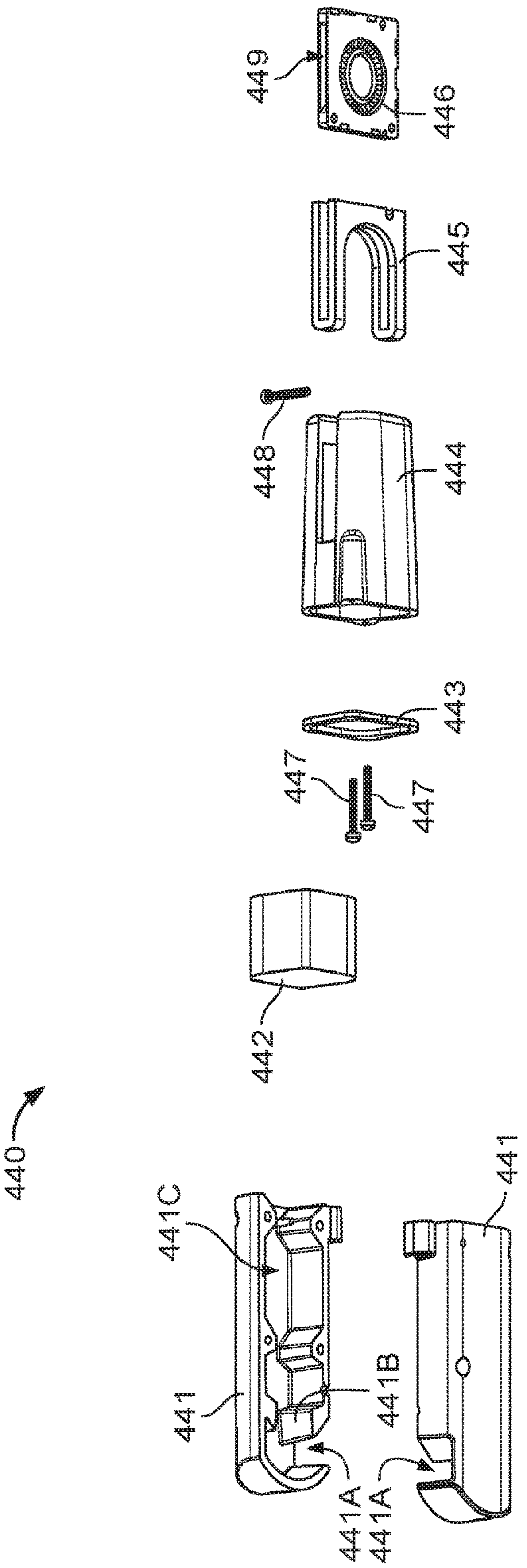

FIGS. 1H & 1I show exploded perspective views of the blower assembly 440, which can be used with any of the pressurized printhead enclosure embodiments described in this application. The blower assembly 440 includes a blower air intake housing 441, which can be constructed from two identical pieces that fit together, as shown. The blower air intake housing 441 includes air inlets 441A, louvers 441B, and filter compartment 441C. The louvers 441B reduce the chances of dust particles reaching a filter 442, which is contained in the filter compartment 441C when the blower air intake housing 441 is put together. The air intake housing 441 is attached with a blower housing 444 using screws 447, and a gasket 443 is coupled between the air intake housing 441 and the blower housing 444.

The gasket 443 can be placed on the inside of the printhead enclosure wall (e.g., an inner surface of the back portion 443 of the print head 400 as illustrated in FIG. 4B) and will help ensure that no air comes into the printhead enclosure without first passing through the filter 442, e.g., built from filter type P15/500S available from Freudenberg Filtration Technologies, Carl Freudenkerg K.G. of Germany. The blower housing 444 can also include a gasket 445, which holds a blower 446 within the blower housing 444, using a screw 448. Note that the blower 446, e.g., part no. KDB0305HA3-00C1J available from Delta Electronic, Inc. of Taiwan, pulls air from either side (both sides of the blower 446 face an internal cavity of the blower housing 444) and pushes air into the interior of the printhead enclosure through air outlet 449.

Referring to FIG. 4B, when the blower assembly 440 is used with the print head 400, the blower 446 pushes air towards an interior surface of the of the removable top portion 460 of the printhead enclosure. The interior surface of the removable top portion 460 is capable of diffusing the air to provide an even distribution of pressure throughout the printhead enclosure of the print head 400. The configuration of the blower assembly 440 illustrated in FIGS. 4A-4B can reduce and/or eliminate the need to remove connections of the blower 446 (which can be fragile in some instances) when disassembling the printhead enclosure to perform services. The configuration of the blower assembly 440 illustrated in FIGS. 4A-4B can also simplify performing maintenance of the filter 442, as access to the filter 442 may only require removal of the air intake housing 441 from the rear plate 430. Although the configuration of the blower assembly 440 illustrated in FIGS. 4A-4B is described as being used with the print head 400, in some implementations, the illustrated configuration of the blower assembly 440 is used with other print heads described in this specification, such as the print head 180 described previously with reference to FIG. 1G.

Figure 2A:
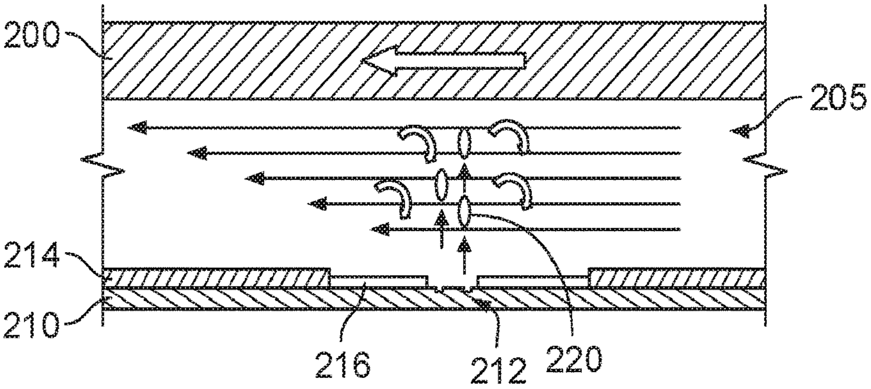
FIG. 2A (Prior Art)
FIG. 2A is a cross-sectional view of a traditional inkjet print head in relation to a substrate.

FIG. 2A is a cross-sectional view of a traditional inkjet print head in relation to a substrate 200. The print head includes a nozzle plate 210 having orifices 212 through which ink drops are ejected. In this example, there are two orifices 212 per jet to provide double ink volume, but in some implementations there is only one orifice per jet, and in some implementations there is more than two orifices per jet. Also, there are multiple jets across the nozzle plate 210 (going into the page) but only one jet is represented in this cross section. The nozzle plate 210 is covered by a housing 214 of the print head and also by a shield 216 immediately adjacent the two sides of the jet orifice(s) 214.

During printing, the substrate 200 moves, as represented by the arrow in FIG. 2A, e.g., at a rate of 0.62 meters per second. Note that the frequency of jetting can be changed in accordance with the speed of the substrate 200 in order to change the horizontal Dots per inch (DPI) print resolution. The DPI in the horizontal direction (multiple strobing of the same data to increase DPI is referred to as print density) is limited by the substrate speed and jetting frequency as DPI is determined by the number of times you can strobe the piezo actuators that eject the ink drops. There are frequency strobing limits where increasing print density requires decreasing the speed of the substrate 200. In addition, the vertical DPI is always the same, as this is the fixed distance between the orifice(s) of each jet, e.g., 200 DPI.

In any case, the motion of the substrate 200 past the print head produces air movement 205 between the two surfaces. This air movement 205 is known as Couette flow, which is the flow of a viscous fluid (in this case air) in the space between two surfaces, one of which is moving tangentially relative to the other. This air flow 205 is driven by virtue of viscous drag force acting on the fluid, but may additionally be motivated by an applied pressure gradient in the flow direction.

When a drop 220 of ink is ejected from the print head, the speed of the jet (e.g., 8 meters per second) entrains the surrounding air by droplet drag and creates an air flow perpendicular to the Couette flow. The interaction of this second air flow with the Couette flow induced by the substrate motion creates little eddy currents shown in FIG. 2A as arrows curving to the right. These eddy currents develop unsteady flow between nozzle plate and moving substrate which misdirect jets to produce wood graining defects in prints. Wood graining defects appear when printing multiple droplets of ink that are in parallel with each other, the jets become crooked due to unsteady flow field (eddy currents) leaving an image that looks like a woodgrain instead of individual parallel lines.

These eddy currents also redirect ink satellites back toward the nozzle plate 210. Note that satellites are created during the natural formation of a drop when it is ejected from the orifice. It is the small narrow section of the drop just before the drop breaks off from the orifice. When the drop breaks off, the tail of the drop can become detached from the main drop body resulting in a much smaller drop (referred to as a "satellite") that follows the main drop body.

These satellites may lose velocity and accumulate on the nozzle plate or get redirected by the eddy currents back to the nozzle plate 212. Ink satellites over time can completely block or reduce the jetting orifice holes that generate the ink droplets resulting in jet outs or crooked jets.

Figure 2B:
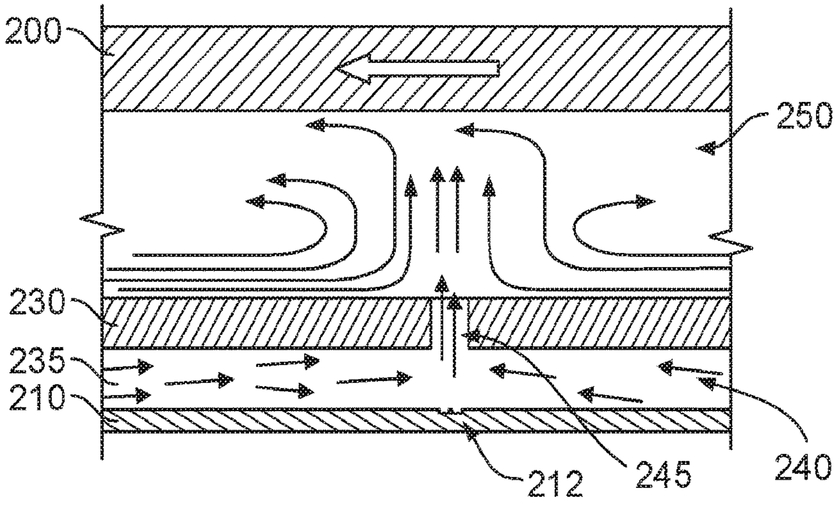
FIG. 2B is a cross-sectional view of an example of an inkjet print head in accordance with the present disclosure.

FIG. 2B is a cross-sectional view of an example of an inkjet print head in accordance with the present disclosure.

The print head includes a nozzle plate 210 having orifices 212 through which ink drops are ejected. In this example, there are two orifices 212 per jet to provide double ink volume, but in some implementations, there is only one orifice per jet, and in some implementations there is more than two orifices per jet. Also, there are multiple jets across the nozzle plate 210 (going into the page) but only one jet is represented in this cross section. The nozzle plate 210 is separated from an enclosure 230 of the print head, creating an airspace 235 between the nozzle plate 210 and the enclosure 230. As described above, this airspace 235 is pressurized, resulting in an air flow 240 between the nozzle plate 210 and the enclosure 230. The air flow 240 passes through a slot 245 in a same direction as the ink drops ejected from the orifice(s) 212 in the nozzle plate 210.

This air flow through the slot 245 contains the ink drops (not shown) as they are ejected by the print head and addresses two issues. First, this air flow prevents dust in the environment exterior to the print head from reaching the nozzle plate 210, where such dust can build up over time and reduce print quality. Second, this air flow can entrain satellites and prevent them from recirculating back and building up on the nozzle plate and prevent wood graining effects due to unsteady flows resulting from eddy currents. These will have positive impacts on jetting performance and print quality. By adding a positive flow of air between the nozzle plate 210 and the front enclosure 230 that exits the slot 245 in the same exit point as the jetting ink, contaminants from the environment are prevented from being able to be drawn into the print head and land on the nozzle plate 210. In some implementations, the positive air flow is set at a rate of 1 liter per minute up to 28 liters per minute using the flat slot configuration shown in FIG. 2B, e.g., a minimum of 1 liter per minute to prevent outside environment contaminants from getting inside the enclosure 230, and a minimum of 7 liters per minute to overcome Couette flow and prevent eddy currents that results in wood graining defects and redirection of ink satellites toward the nozzle plate. Other air flow rates and ranges are also possible, such as 1-30 liters per minute and 7-30 liters per minute.

Creating the positive pressure from the print head around the jetting ink has an impact on reducing or eliminating satellites build up on the nozzle plate 210 by overcoming or eliminating the Couette flow and entraining the satellites into the airflow through the slot and removing them from the area of the nozzle plate. The slot design can cause even airflow distribution in the gap between the slot 245 and the substrate 200, entrain ink satellites and dust particles into the airflow to direct them away from the nozzle plate, and prevent dust and ink from accumulating around the slot 245 opening on the exterior surface of the enclosure 230. In addition, the outflow air from the slot 245 can aid the ink drop trajectory without affecting the print quality.

In some implementations, for the airflow to be effective for the satellites issue, the positive airflow rate should be equal to or greater than the flow rate of the substrate speed. That said, there is a limit on how high a flow rate one can achieve and remain effective for the elimination of satellites. As the airflow is increased, any mismatch in the flow velocity between the left and right side of the nozzle plate can become amplified. This can result in an uneven airflow along the slot 245 and misdirect the jetting ink drops to produce poor print quality. To address this issue, better diffusion of airflow within the printhead should be ensured, e.g., a diffused flow configuration can be preferred over direct flow configuration for flow rates >19 Lit/Min up to 30 Lit/Min.

Figure 2C:
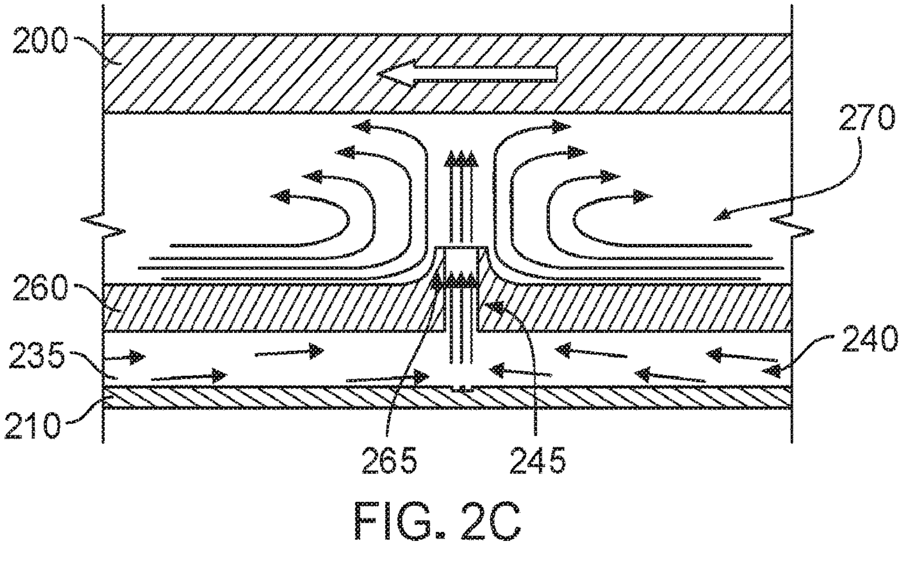
FIG. 2C is a cross-sectional view of another example of an inkjet print head in accordance with the present disclosure.

FIG. 2C is a cross-sectional view of another example of an inkjet print head in accordance with the present disclosure. As shown, an enclosure 260 of the print head includes a shaped exterior piece 265 for the slot 245. This shaped exterior piece 265 affects the interaction of the Couette flow with the airflow 240 exiting the slot 245. Adding a curve 265 to the leading and trailing edges of the slot 245 opening helps with lower flow rates (e.g., 7-15 Lit/Min) in that it directs airflow outside the printhead enclosure to curve away 270 from the slot on both sides. With the configuration shown in FIG. 2C, the air flow 240 coming out of the slot 245 can go up to at least 28 liters per minute with diffused flow configuration and still reduce or eliminate satellites and dust from reaching the nozzle plate 210. Note that in general, the airflow coming out of the slot 245 should be greater than or equal to the speed of the substrate 200. By modifying the shape of the slot 245, and in particular the exterior shape(s) around the slot 245, the Couette flow can be mitigated even at lower air flow rates (e.g., 7-15 Lit/Min) to maximize filter life.

FIGS. 3A-3F show examples of slot shapes usable for a printhead enclosure in accordance with the present disclosure. In each of these examples, positive air pressure is created inside the printhead enclosure (as described) to push air through the slot in the same direction as the ejected ink drops. This airflow from the print head means that a shield is not needed over the nozzle plate. Note that this pressure level is outside the print engine and is distinct from pressure level(s) used inside the print engine (e.g., a low vacuum level used to prevent weep from the print head and a high vacuum level used to pull air out of the ink).

Figure 3A:
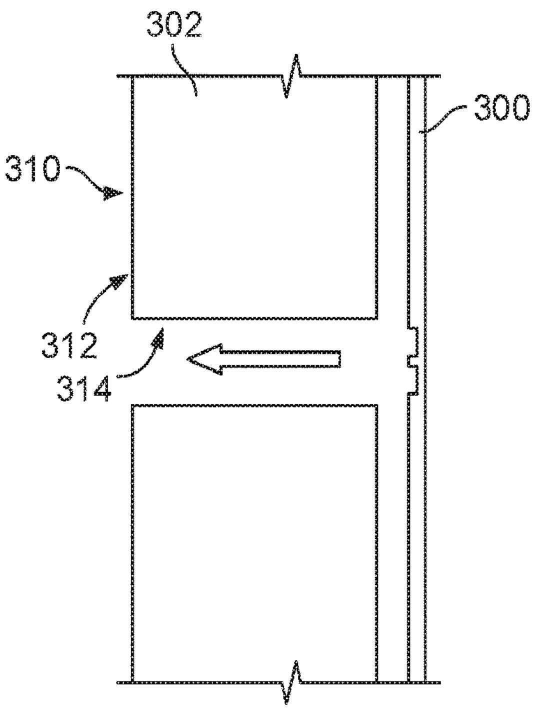
FIGS. 3A-3F show examples of slot shapes usable for a printhead enclosure in accordance with the present disclosure.

FIG. 3A is a cross section of a slot shape 310 formed in an enclosure 302 of a print head in relation to a nozzle plate 300 having orifices through which ink drops are ejected; as before, two orifices are shown per jet (to provide double ink volume) but there can also be one orifice per jet or more than two orifices per jet. The slot 310 geometry is a straight extrusion for airflow. This geometry will prevent factory dust from entering the enclosure but may have a higher minimum airflow requirement to overcome/neutralize a given Couette flow induced by the substrate motion.

The slot shape 310 corresponds to that shown in FIG. 2B, which has a flat exterior surface 312 approaching the slot and also a flat interior surface 314 for the slot itself. While the length of the slot (distance going into the page) will generally depend on the length of the array of orifices in the nozzle plate 300 (i.e., the number of jets and spaces between in the print engine), various embodiments of the present disclosure can employ (1) different thicknesses for the enclosure 302, which can impact the height of the slot (left-right distance in FIG. 3A), (2) different slot widths (up-down distance in FIG. 3A) which impacts the rate of air flow through the slot, and/or (3) different distances between the inside surface of the enclosure 302 and the exterior of the nozzle plate 300, which can affect the air flow patterns as air is pushed into and through the slot.

Figure 3B:
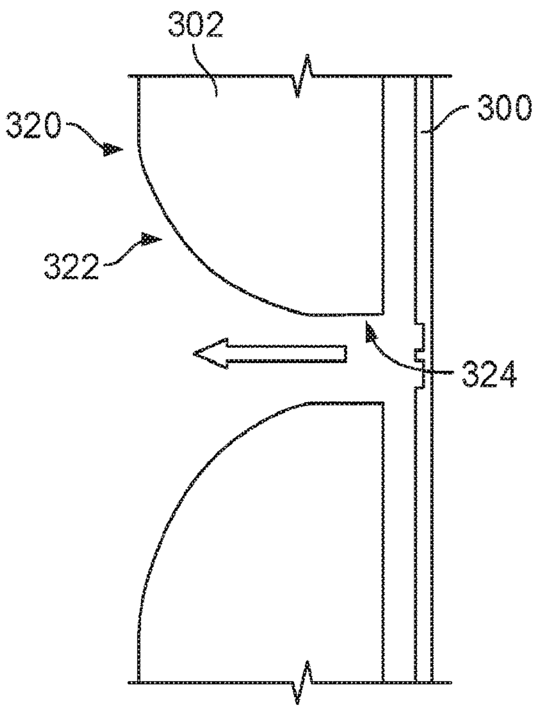

FIG. 3B is a cross section of a slot shape 320 formed in the enclosure 302 of the print head in relation to the nozzle plate 300. In this example, the thickness of the enclosure 302 has not been changed, but the leading and trailing edge surfaces of the slot have been modified. Specifically, a curve 322 has been added to create a smooth transition from the exterior surface of the printhead enclosure 302 to a flat portion 324 of the interior surface of the slot. The slot 320 has a diverging slot geometry, where the inlet area is much smaller compared to the outlet area. This creates a pressure difference along the slot length especially at higher flow rates (~30 Liters/min), and low-pressure regions can be produced in the slot outlet area, which can attract dust particles towards the slot opening. Further, the pressure differences along the slot length can affect the trajectory of jetting ink drops which in turn will affect the print quality.

Furthermore, the diverging profile induces turbulence in the velocity profile along the slot length which prevents even flow distribution between enclosure and substrate, which is undesirable. Similarly, a converging slot interior (the inverse of slot shape 320, where the outlet area is much smaller compared to the inlet area) can produce high velocity zones at the top and bottom regions of the slot opening, resulting in flow recirculation. At these zones, the slot exit velocity is high enough to overcome Couette flow induced by the substrate motion, but the converging profile also creates turbulence in the velocity profile along the slot length which prevents even flow distribution between the enclosure and the substrate. Thus, the specific shape of the slot is a key factor in making the system effective, as a slot shape that create air turbulence or mismatch will be less effective at preventing satellites from reaching the nozzle plate and can negatively impact print quality.

Figure 3C:
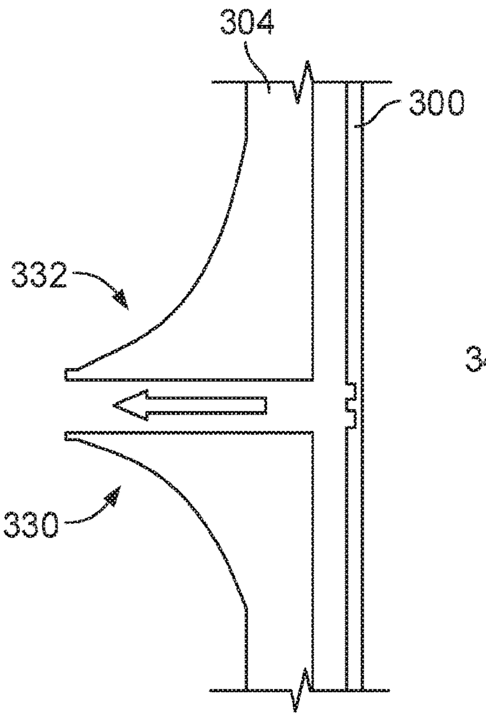

FIG. 3C is a cross section of a slot 330 formed in an enclosure 304 of the print head in relation to the nozzle plate 300. As shown, the enclosure 304 is thinner than the enclosure 302, and an exterior shape 332 has been added to the slot 330, both to increase the height of the slot 330 and to overcome/neutralize the Couette flow created by the moving substrate. This slot geometry (with a straight air channel and a curvature on the exterior) causes the high velocity air flow from the slot opening to entrain the ambient air particles, which follow the shape of the exterior curvature. For airflow rates ≥7 liters per minute, the slot design 330 dictates the flow field by neutralizing the Couette flow effect of the moving substrate. At 10 liters per minute, this slot geometry produces almost perfect flow separation profiles that deflect dust particles successfully away from the jetting array. The minor recirculation zones observed near the top and bottom regions of the slot opening are away from the region of interest.

Figure 3D:
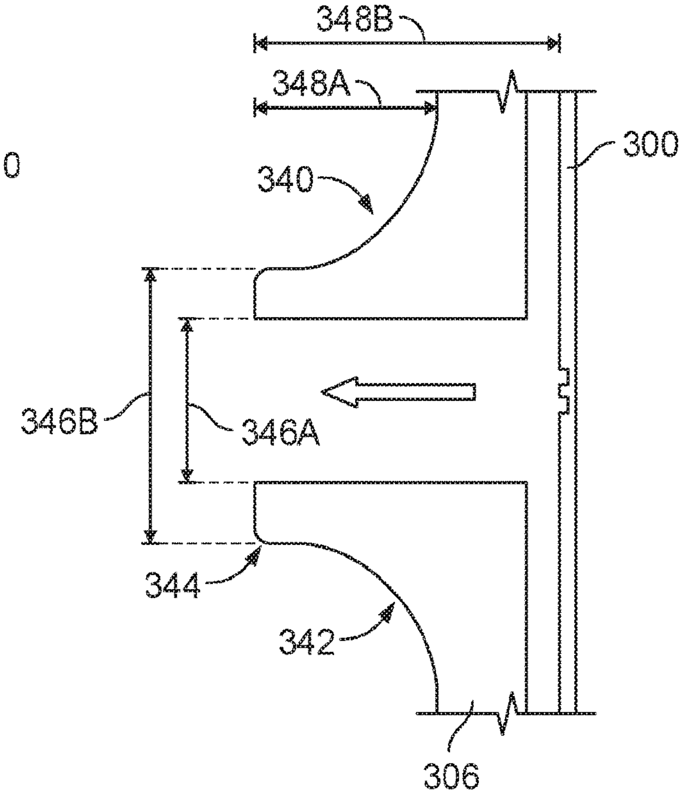

The slot shape 330 corresponds to that shown in FIG. 2C, but further modifications of the shapes and sizes of the slot 330 can be made while still having an exterior shape that prevents the Couette flow (generated by the movement of the substrate) from sweeping factory air across the front of the slot. FIG. 3D shows a slot 340 formed in an enclosure 306 of the print head in relation to the nozzle plate 300. As shown the exterior shape of the slot 340 includes a first curve 342 and a second curve 344. These curves can both improve the functioning of the slot 340 and make the slot 340 easier to manufacture. In some implementations, the slot 340 has a first curve 342 with a radius of curvature of 1.5 mm, an interior width 346A (slot opening) of 3.0 mm, an exterior width 346B of 4.0 mm, a height 348A of 2.0 mm, and a height 348B from the nozzle plate 300 of 3.5 mm. These dimensions are for use with traditional drop-on-demand (DOD) ink jet print engines and can be changed when the dimensions of the jetting array changes. In addition, these dimensions can be varied in different implementations, subject to the following issues.

As the width 346B gets larger, e.g., greater than 5.0 mm, there is a risk that the leading edge of the slot will be too far away from the airflow coming out of the slot, such that it no longer produces enough drag to affect the Couette flow. Also, the slot opening 346A should be wide enough that the ejected drops have enough clearance to not come in contact with the side walls of the slot. In the example described, the inkjet nozzles on the nozzle plate 300 are 0.5 mm in width, so the opening 346A should provide a margin on either side that allows for a buffer of at least 1.25 mm. If the opening 346A is too small, ink can build up and impact the airflow. In some cases, the slot channel width 346A should be at least 2.7 mm to overcome the boundary layer effects of the slot wall on the airflow. Moreover, increasing the width 346A of the slot can reduce the slot exit velocity, which can result in undesirable eddy currents.

The heights 348A, 348B for the slot are based on the maximum throw distance of the jetting technology. In the present example, the throw distance for the hotmelt ink jet printer is up to 8 mm (other throw distances are also possible). Anything over this distance means the jets start to fall prior to hitting their intended target area, resulting in print quality issues. The dimensions provided above allow the slot shape to redirect the Couette flow and also have some clearance between the slot and the substrate. It also allows for a 1 mm gap for the air to pass between the nozzle plate 300 and the interior surface of the enclosure 306 (e.g., the front cover of the print head) before passing out the slot opening.

The slot radius 342 can be varied, subject to restrictions due to the slot height 348A, and in some cases, the slot radius 342 should be less than or equal to 2.0 mm. For radiuses up to 2.0 mm, the curvature of the slot geometry directs the airflow more uniformly on both sides of the slot opening and successfully neutralizes the Couette flow effect from the moving substrate. For radiuses greater than 2.0 mm, the curvature may not be sufficient to promote uniform flow distribution on both sides of the slot opening. Couette flow effect of the substrate motion becomes more dominant as the slot radius increases. In addition, the slot length can be increased without affecting print performance. However, it is generally preferable to limit the slot length to encompass the top and bottom jets comfortably without further lengthening because, as the slot length increases, the average slot air exit velocity decreases for the same amount of air intake into the print head.

Thus, in some implementations, a slot shape with a straight internal channel and a curved exterior surface is used, as shown in FIG. 3D. The slot radius 342 can be in the range of 1.0 to 2.0 mm, the interior width 346A can be in the range of 2.7 to 4 mm, the exterior width 346B can be in the range of 4 to 5.0 mm, the height 348A can be in the range of 1.0 to 5.5 mm and the height 348B can be in the range of 2.5 to 7.0 mm.

In addition, it should be noted that reducing the distance between the front of the slot opening and the surface of the substrate on which printing will occur can improve performance, allowing for lower air flow rates and increased filter life. Generally, this distance should be less than or equal to 3.0 mm, less than or equal to 2.0 mm, or less than or equal to 1.0 mm. In some cases, using a distance of less than or equal to 1.0 mm between the front of the slot opening and the surface of the substrate with the slot geometry 340 enables the Couette flow effect to be overcome/neutralized at air flow rates between 5 and 7 liters per minute.

Figure 3E:
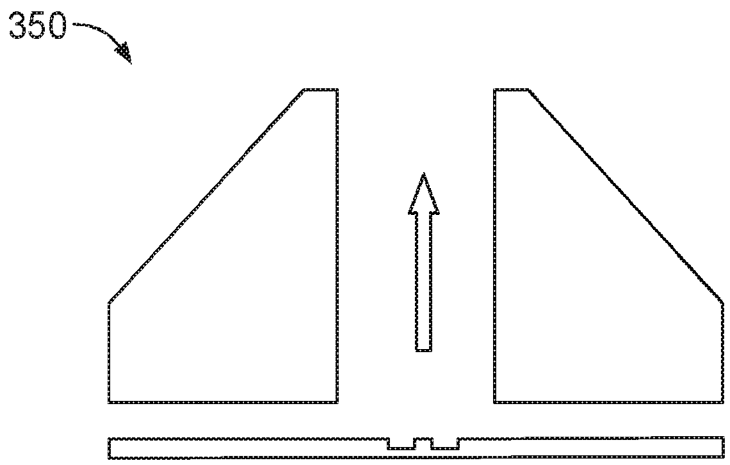
Figure 3F:
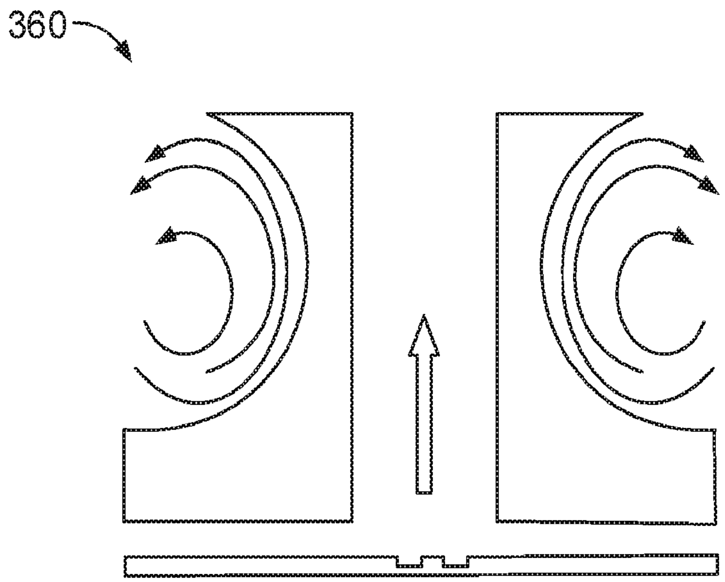

Additional slot shapes for the nozzle of the print head are also possible. FIG. 3E shows a slot 350 for an inkjet nozzle plate. FIG. 3F shows another slot 360 for an inkjet nozzle plate. Note that the slot shape 360 provides even further redirection of Couette flow, as shown, allowing for a natural fold back of the airflow on both sides of the slot. However, the slot shape 360 can pose challenges during manufacturing. The slots described in connection with FIGS. 3A-3F can be molded into the printhead enclosure or added after the printhead enclosure is initially constructed. Various manufacturing systems and techniques can be used to construct the slots described in connection with FIGS. 3A-3F, including injection molding, computer-numerical-control (CNC) milling, and three dimensional (3D) printing. However, it should be noted that the interior wall surface(s) of the slot can be made smooth to facilitate a consistent airflow (with as little turbulence as possible) coming out of the slot, and some 3D printing techniques can produce ribs or other protrusions that are undesirable on the interior surfaces of the slot. In some implementations, less smooth interior wall surfaces can be used in the slot when the slot is made wider to ensure the air in which the ink drops travel has a laminar flow, i.e., laminar airflow through the center of the slot in line with the drops, such that any air turbulence along the interior walls of the slot do not affect the drop flight and placement. In addition, although the slots shown and described in connection with FIGS. 3A-3F are all mirror images with respect to the leading and trailing edges, it will be appreciated that this is not required. In some implementations, the shape of the leading edge of the slot is different from the shape of the trailing edge of the slot.

In general, the exterior shape of the slot is designed to facilitate overcoming/neutralizing Couette flow at lower airflow rates (e.g., less than or equal to 10 liters per minute). This facilitates maximizing the life of the filter used for the intake air because less volume of air per unit of time translates into fewer particles being captured by the filter per unit of time.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiment described above can be combined with any of the other features of the embodiment described above.

Thus, particular embodiments of the invention have been described. Other embodiments are within the scope of the following claims. For example, the actions recited in the claims can be performed in a different order and still achieve desirable results. In addition, the systems and methods described are applicable to various printer technologies, e.g., continuous inkjet printer, as well as outside of printer technologies, e.g., to fluid jetting devices generally.

What is claimed is:

1. A printing device comprising:

a print head comprising a print engine, including multiple nozzles, and circuitry configured to selectively eject ink through the multiple nozzles to form an image on a moving substrate, and to purge the ink through the multiple nozzles; and a printhead enclosure of the print head, the printhead enclosure having an opening in front of the multiple nozzles to allow the selectively ejected ink to pass through the opening when the selectively ejected ink is ejected toward the moving substrate;

wherein the printhead enclosure comprises a hole placed away from the multiple nozzles; and wherein the printhead enclosure is configured to direct the ink that is purged through the multiple nozzles along an inside surface of the printhead enclosure to the hole through which the ink flows and exits the printhead enclosure.

2. The printing device of claim 1, wherein the printhead enclosure comprises a protrusion at the hole, the protrusion extending below an outer bottom surface of the printhead enclosure in a print orientation, and the protrusion having a surface portion below the outer bottom surface of the printhead enclosure in the print orientation, wherein the surface portion of the protrusion is small enough that gravitational force overcomes surface tension of the ink at the surface portion of the protrusion.

3. The printing device of claim 2, wherein the outer bottom surface of the printhead enclosure is a first outer bottom surface of the printhead enclosure adjacent the protrusion, and the printhead enclosure comprises an edge placed between the first outer bottom surface of the printhead enclosure and a second outer bottom surface of the printhead enclosure in the print orientation, the edge being configured and arranged to prevent the ink from spreading to the second outer bottom surface of the printhead enclosure.

4. The printing device of claim 2, wherein the protrusion extends below the outer bottom surface of the printhead enclosure in the print orientation by at least two millimeters.

5. The printing device of claim 1, wherein the ink is a liquid ink, and the inside surface of the printhead enclosure defines a channel, wherein the channel is angled with respect to a horizontal plane of a print orientation of the print head to cause the liquid ink that is purged through the multiple nozzles to flow through the channel to the hole, the channel having a higher end located under the multiple nozzles and a lower end located at the hole.

6. The printing device of claim 5, wherein the inside surface of the printhead enclosure comprises one or more steps, one or more sloped surfaces, or one or more wedge shapes that define the channel.

7. The printing device of claim 1, wherein a surface of the printhead enclosure proximate to the opening and in front of the multiple nozzles comprises a sloped surface configured to prevent the ink that is purged from exiting the printhead enclosure through the opening.

8. The printing device of claim 7, wherein the opening and the sloped surface are integral with the printhead enclosure.

9. The printing device of claim 7, wherein:

the printhead enclosure comprises a separate piece; and the opening and the sloped surface are integral with the separate piece.

10. The printing device of claim 1, wherein the ink is a phase change ink, the print head comprises a component positioned along the inside surface of the printhead enclosure, the component is configured to be heated, and the inside surface of the printhead enclosure is angled with respect to a horizontal plane of a print orientation of the print head to cause the phase change ink that is purged through the multiple nozzles to flow to the hole, when the phase change ink is heated by the component, the inside surface having a higher end located under the multiple nozzles and a lower end located at the hole.

11. The printing device of claim 10, wherein the component is positioned at a distance from the inside surface of the printhead enclosure that is small enough that the phase change ink stays melted under the component, along a channel to the hole, when the component is heated; and wherein the component includes a portion that extends into the hole to keep the phase change ink melted as the phase change ink passes through the hole.

12. The printing device of claim 11, wherein the printhead enclosure comprises a protrusion at the hole, the protrusion extending below an outer bottom surface of the printhead enclosure in the print orientation, the protrusion having a surface portion below the outer bottom surface of the printhead enclosure in the print orientation, and the portion of the component that extends into the hole extends at least half way through the hole and does not extend beyond the protrusion.

13. The printing device of claim 11, wherein the channel is formed by a quantity of the phase change ink that spreads away from the component along the inside surface of the printhead enclosure and solidifies beyond the distance from the component.

14. The printing device of claim 10, wherein the print head comprises an ink reservoir for the phase change ink, the component comprises a heating wall for the ink reservoir, and the heating wall extends beyond the ink reservoir to a distance from the inside surface of the printhead enclosure; wherein the distance is small enough that the phase change ink stays in contact with both the heating wall and the inside surface of the printhead enclosure along a channel, when the phase change ink is melted, until the phase change ink passes through the hole.

15. The printing device of claim 14, wherein the angle of the inside surface of the printhead enclosure with respect to the horizontal plane of the print orientation of the print head is a one degree angle.

16. The printing device of claim 15, wherein the distance is between one tenth of a millimeter and five tenths of a millimeter, inclusive.

17. The printing device of claim 14, wherein the channel is formed by a quantity of the phase change ink that spreads away from the heating wall along the inside surface of the printhead enclosure and solidifies beyond the distance from the heating wall.

18. The printing device of claim 14, wherein the inside surface of the printhead enclosure defines the channel from the higher end of the inside surface located under the multiple nozzles to the lower end of the inside surface located at the hole, such that the channel is also angled with respect to the horizontal plane of the print orientation of the print head to cause the phase change ink that is purged through the multiple nozzles to flow along the channel to the hole, when the phase change ink is heated by the heating wall.

19. The printing device of claim 18, wherein the inside surface of the printhead enclosure comprises one or more steps, one or more sloped surfaces, or one or more wedge shapes that define the channel.

20. The printing device of claim 19, wherein the printhead enclosure comprises a top portion and a bottom portion, and the inside surface is located in the bottom portion of the printhead enclosure.

21. The printing device of claim 1, wherein the inside surface is a first inside surface that is angled with respect to a horizontal plane of a first print orientation, the first inside surface having a lower end located at the hole and a higher end located under the multiple nozzles in the first print orientation, the hole is a first hole in the first inside surface, the printhead enclosure comprises a second hole in a second inside surface of the printhead enclosure, and the second inside surface of the printhead enclosure is angled with respect to a horizontal plane of a second print orientation of the print head, the second inside surface having a lower end located at the second hole and a higher end located under the multiple nozzles in the second print orientation.

22. The printing device of claim 21, wherein the ink is a phase change ink, the print head comprises a heating component or an extended heating wall for an ink reservoir in the print head, and the heating component or the extended heating wall is positioned at a distance from each of the first and second inside surfaces of the printhead enclosure that is small enough that the phase change ink stays melted under the heating component or the extended heating wall, along a channel to either the first hole or the second hole, when the heating component or the extended heating wall is heated.

23. The printing device of claim 1, wherein the hole is located in a back half of the printhead enclosure opposite the opening.

24. The printing device of claim 1, wherein the opening comprises a slot aligned with the multiple nozzles, and the printhead enclosure is configured to contain a pressurized airspace at least in front of the multiple nozzles and cause airflow through the slot at a flow rate that prevents dust and debris from entering the slot while the selectively ejected ink passes through the slot and the airflow without a direction of the selectively ejected ink being impeded by the airflow.

25. The printing device of claim 24, wherein the pressurized airspace is set at a pressure level that causes the flow rate of air through the slot to:

interrupt Couette flow caused by the moving substrate; and reduce entraining of satellite drops of ink in the Couette flow.

26. The printing device of claim 1, wherein the printhead enclosure comprises a pressure source located inside the printhead enclosure and configured to cause air to enter the printhead enclosure through a filter located outside of the printhead enclosure.

27. The printing device of claim 26, wherein the pressure source is configured and arranged to direct the air towards one or more inner surfaces of the printhead enclosure that diffuse the air so as to provide an even distribution of pressure throughout the printhead enclosure.

28. A printing system comprising:

a controller device comprising a user interface;

a print bar configured to receive two or more print heads; and two or more print heads configured to attach to the print bar and configured to communicatively couple with the controller device, and each of the two or more print heads comprising:

a print engine, including multiple nozzles, and circuitry configured to selectively eject ink through the multiple nozzles to form an image on a moving substrate, and to purge the ink through the multiple nozzles; and a printhead enclosure, the printhead enclosure having an opening in front of the multiple nozzles to allow the selectively ejected ink to pass through the opening when the selectively ejected ink is ejected toward the moving substrate;

wherein the printhead enclosure comprises a hole placed away from the multiple nozzles; and wherein the printhead enclosure is configured to direct the ink that is purged through the multiple nozzles along an inside surface of the printhead enclosure to the hole through which the ink flows and exits the printhead enclosure.

* * * * *